MIXING CIRCUIT

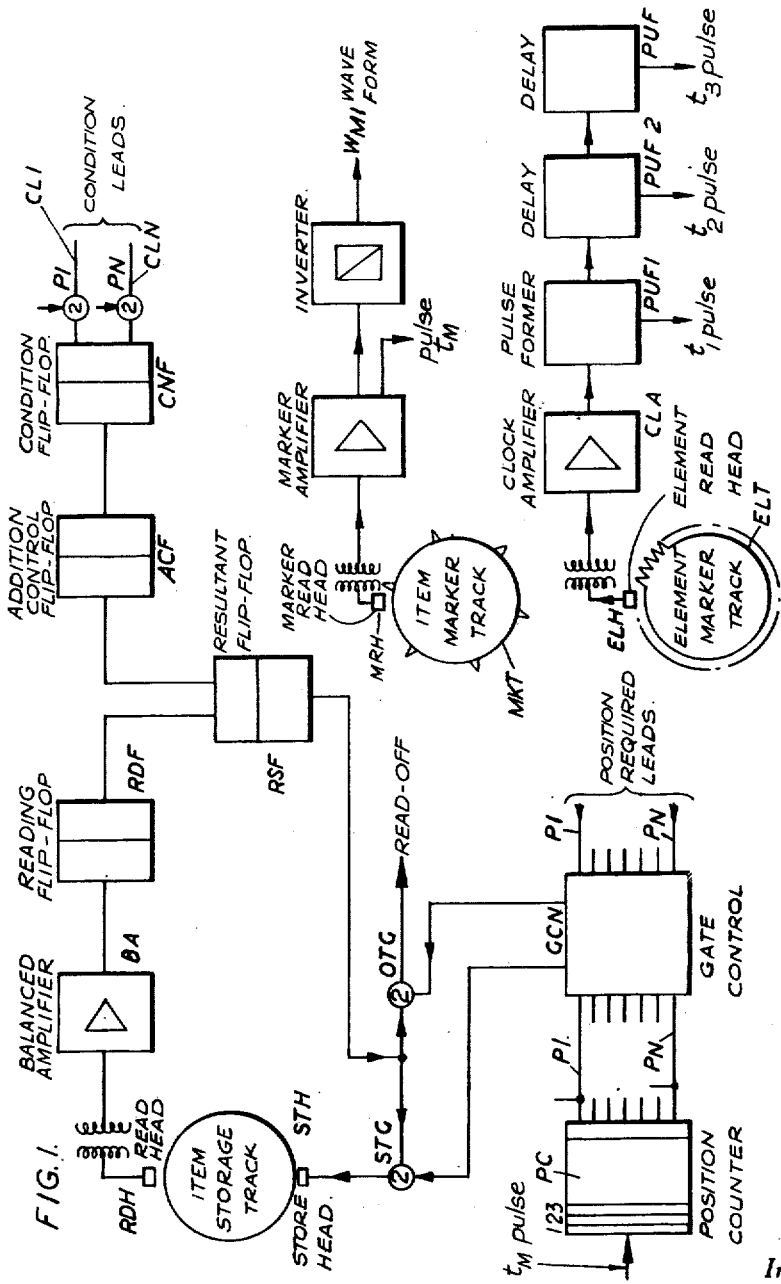

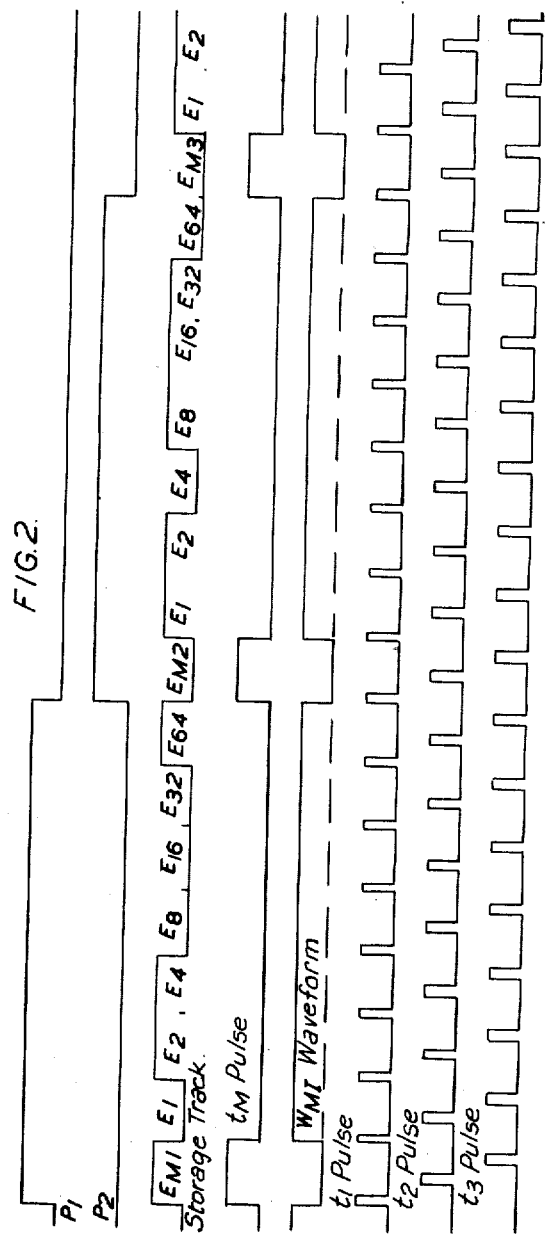

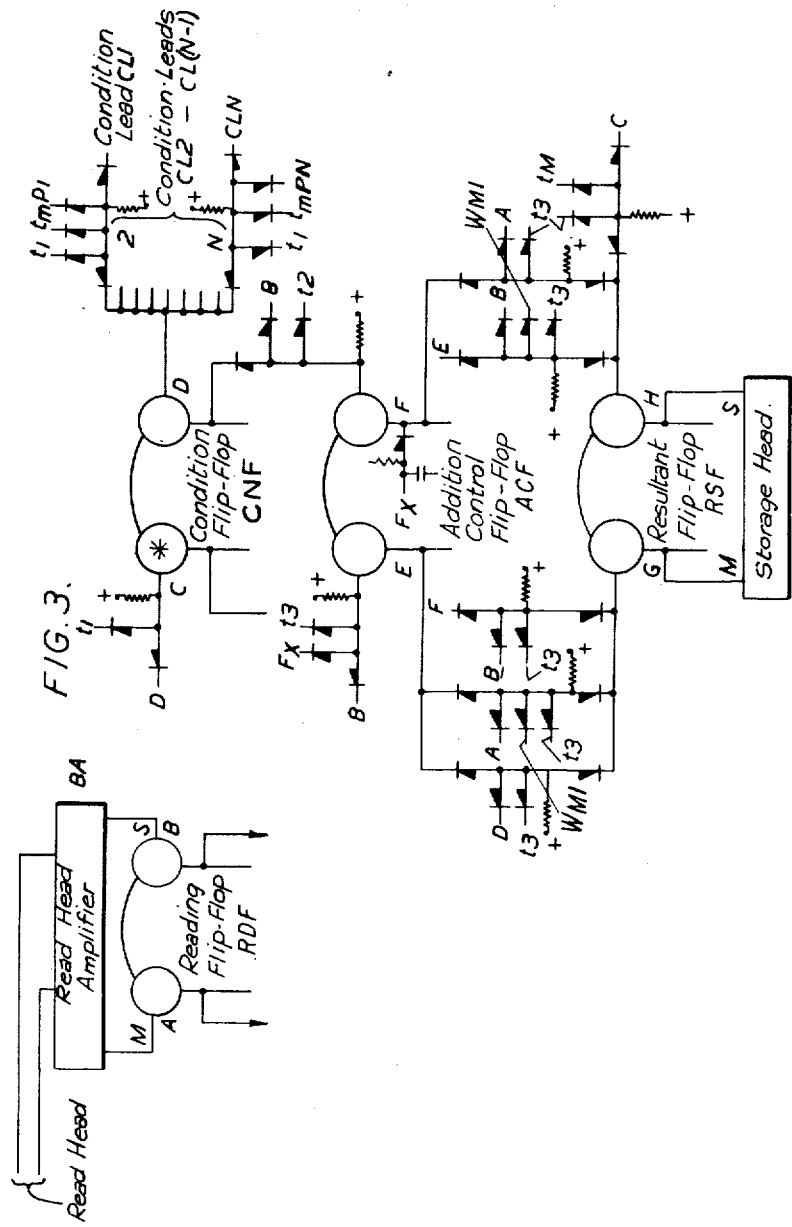

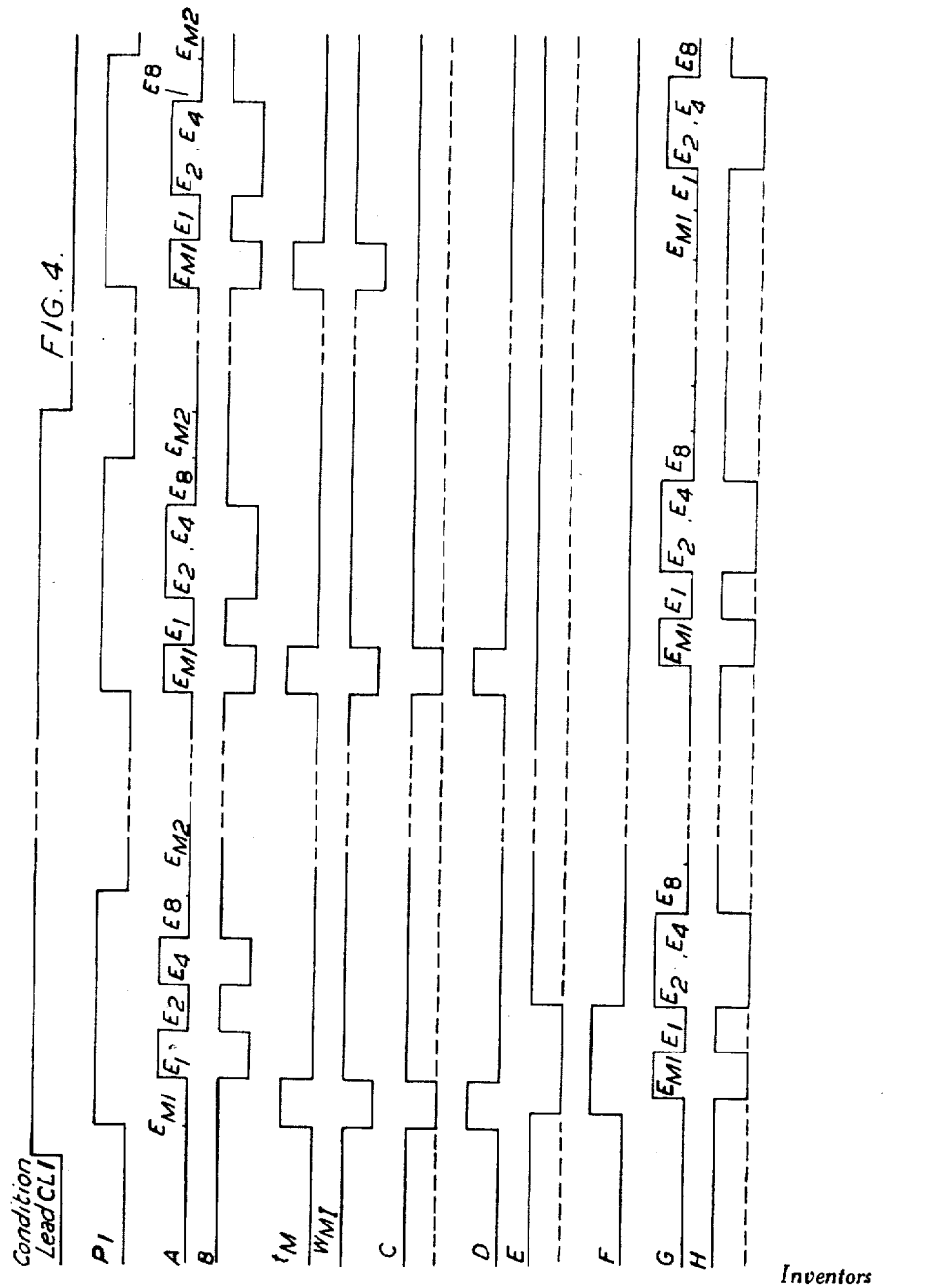

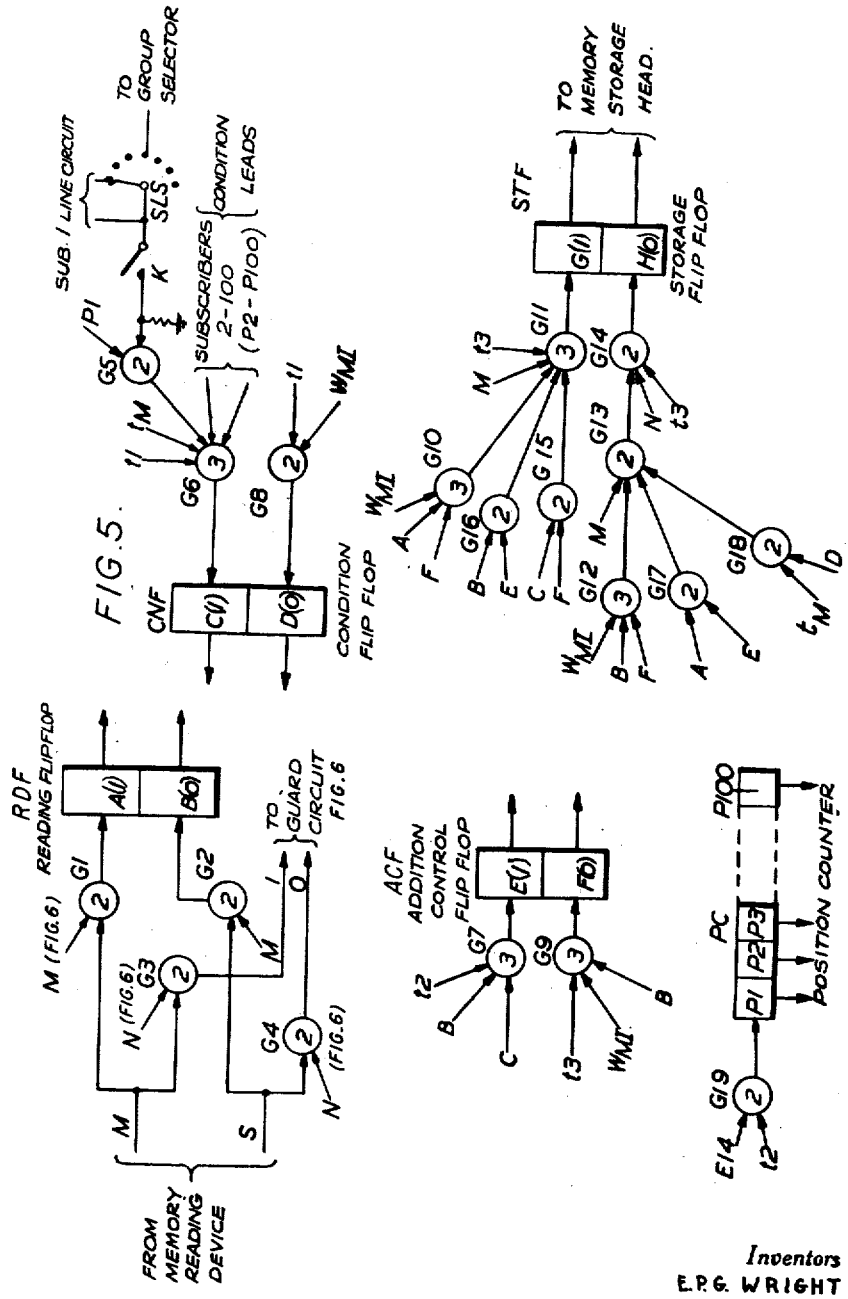

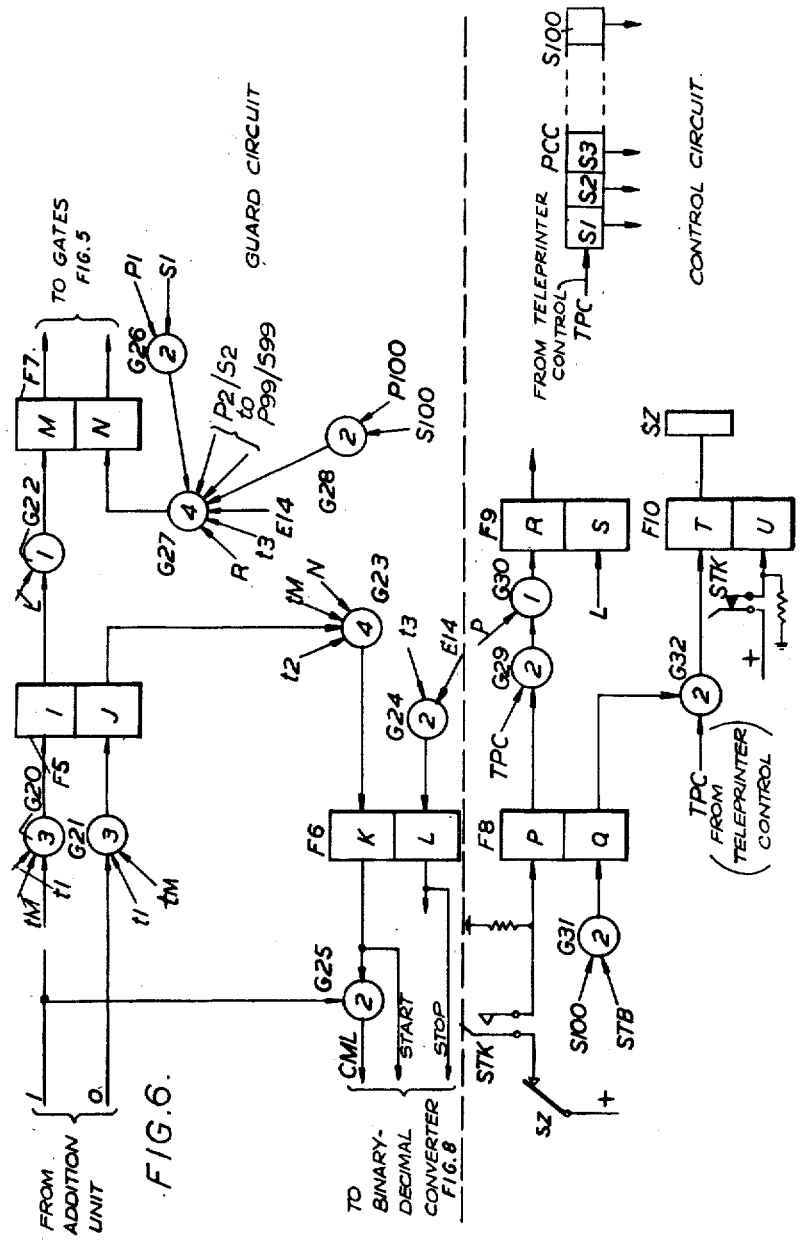

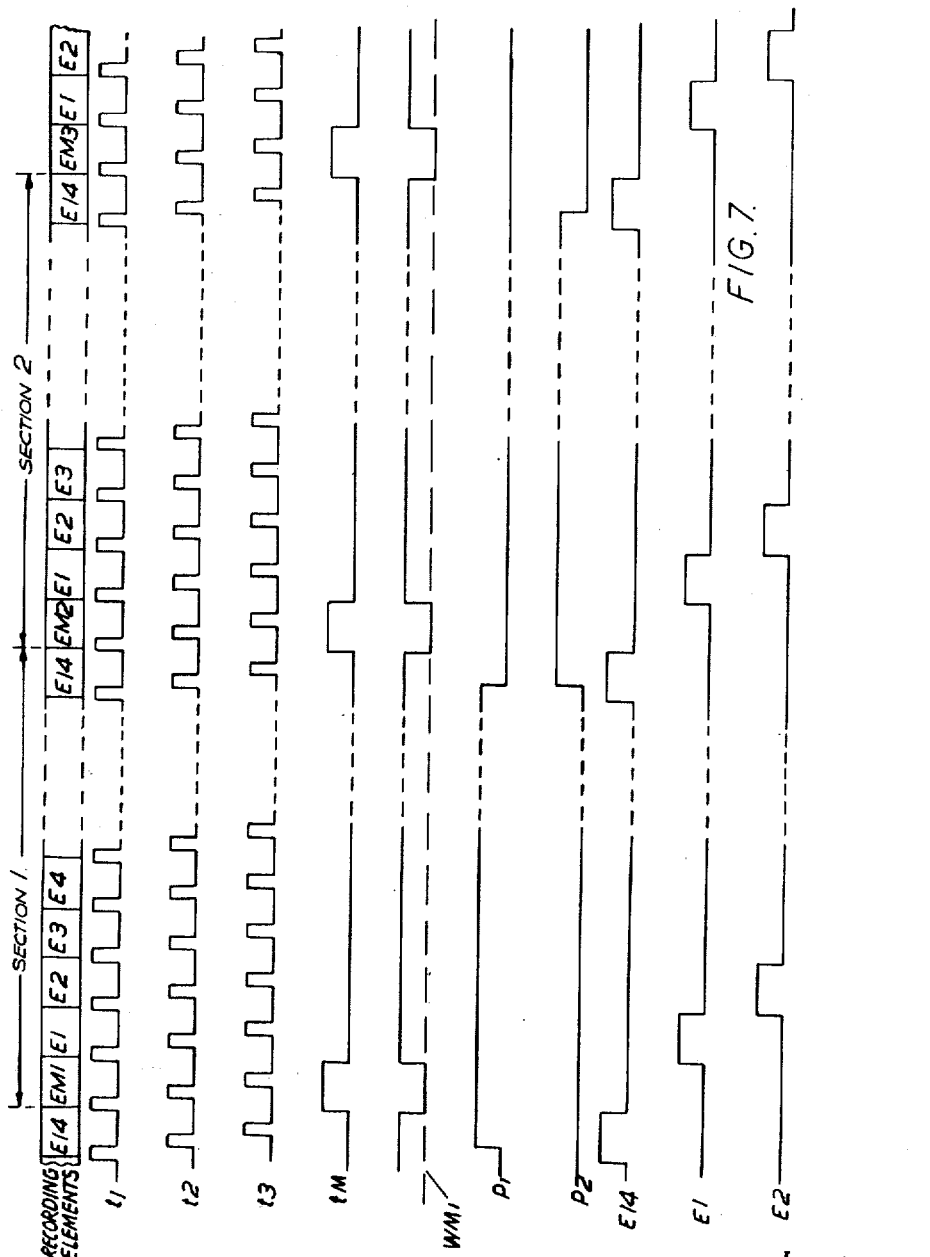

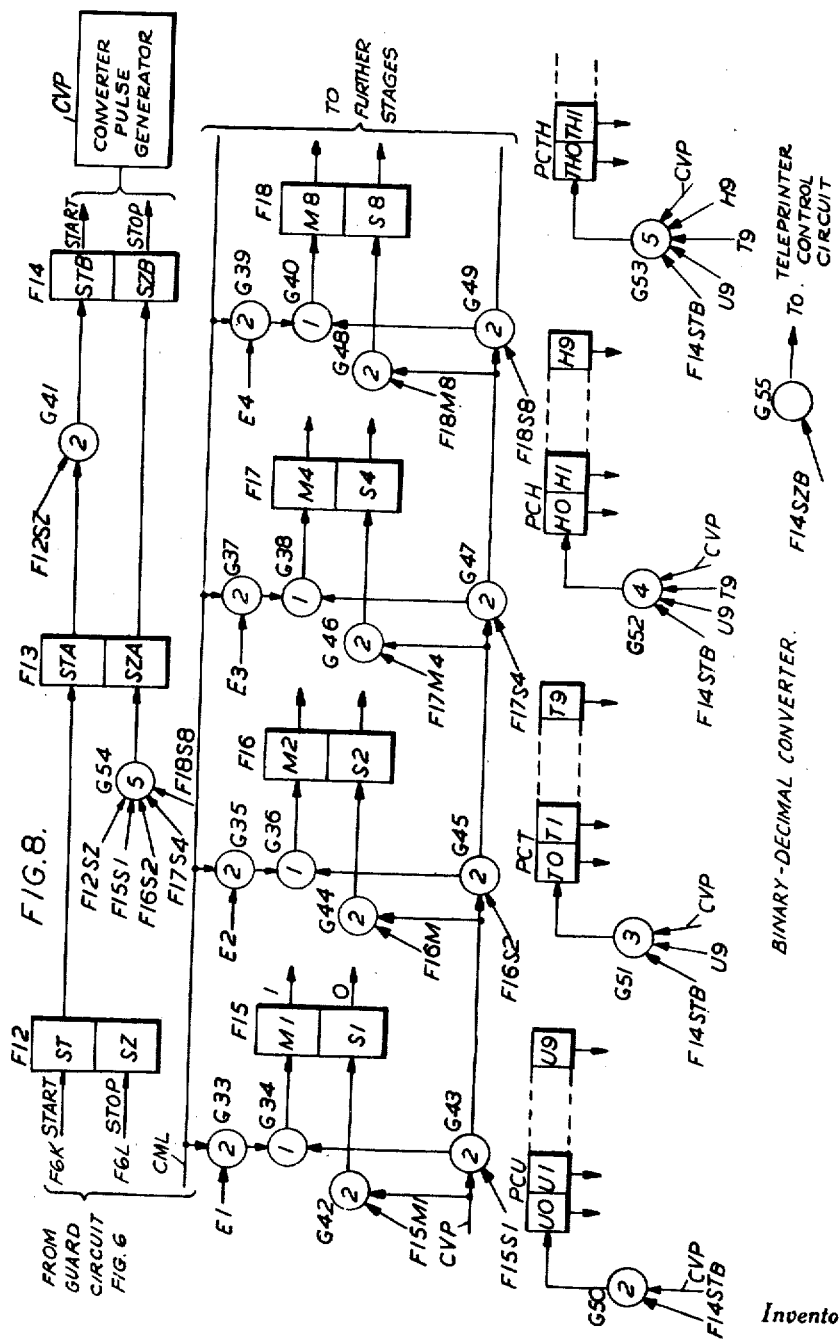

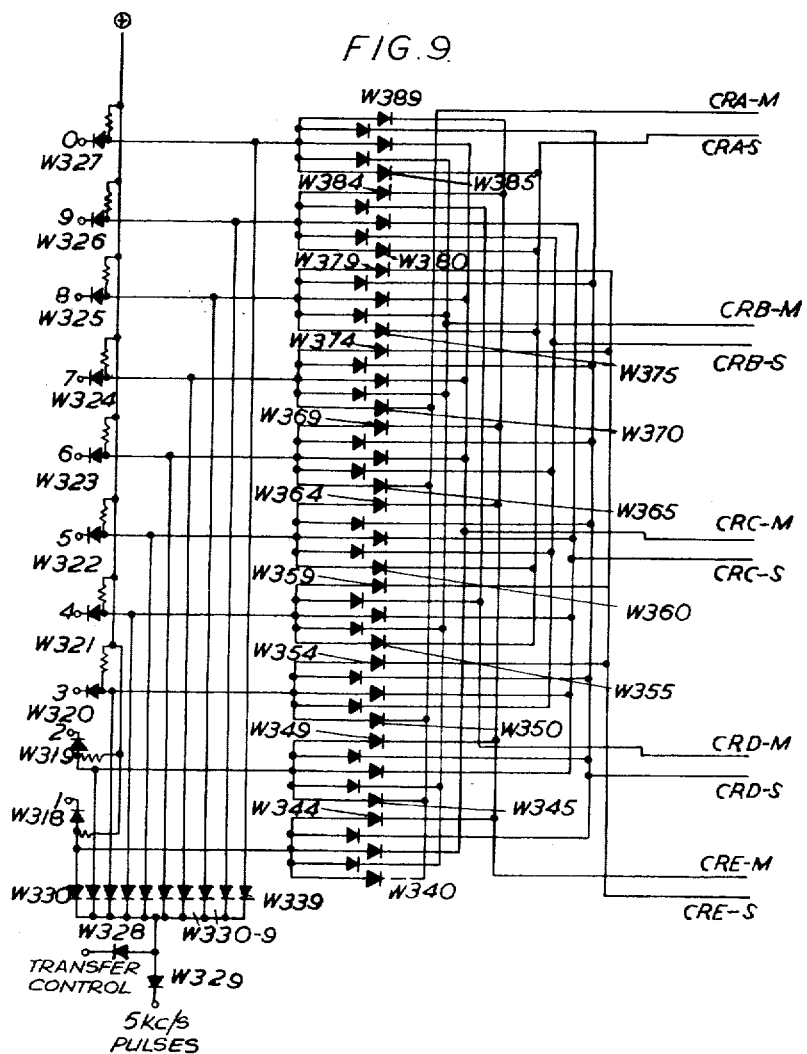

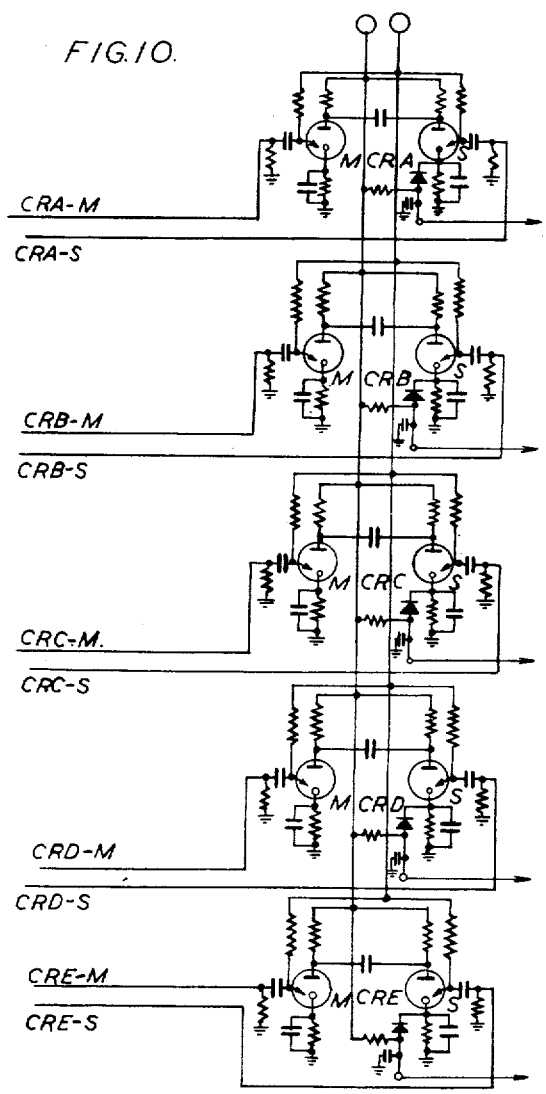

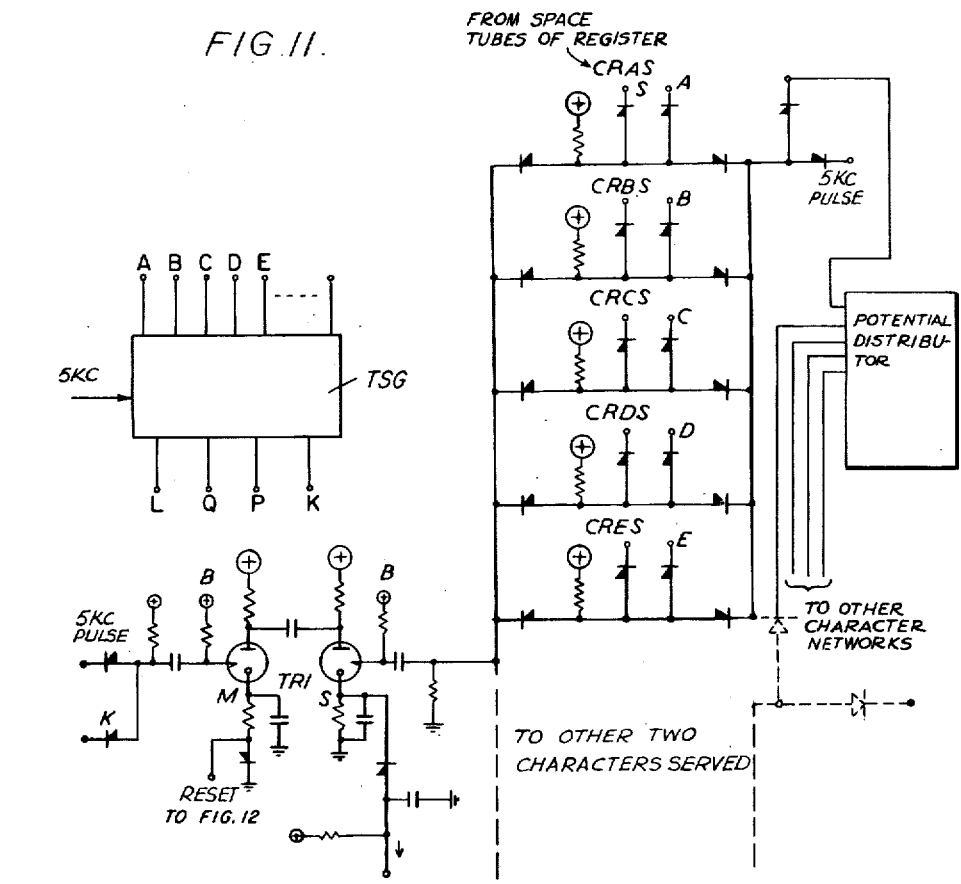
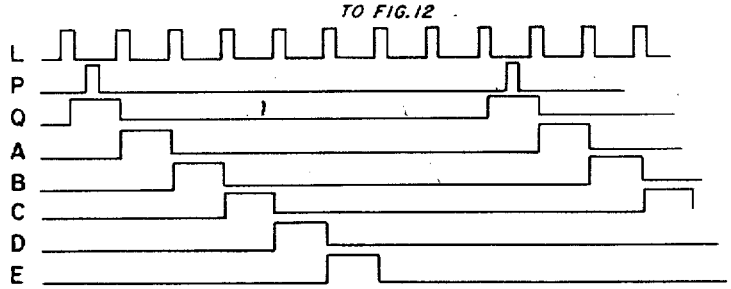

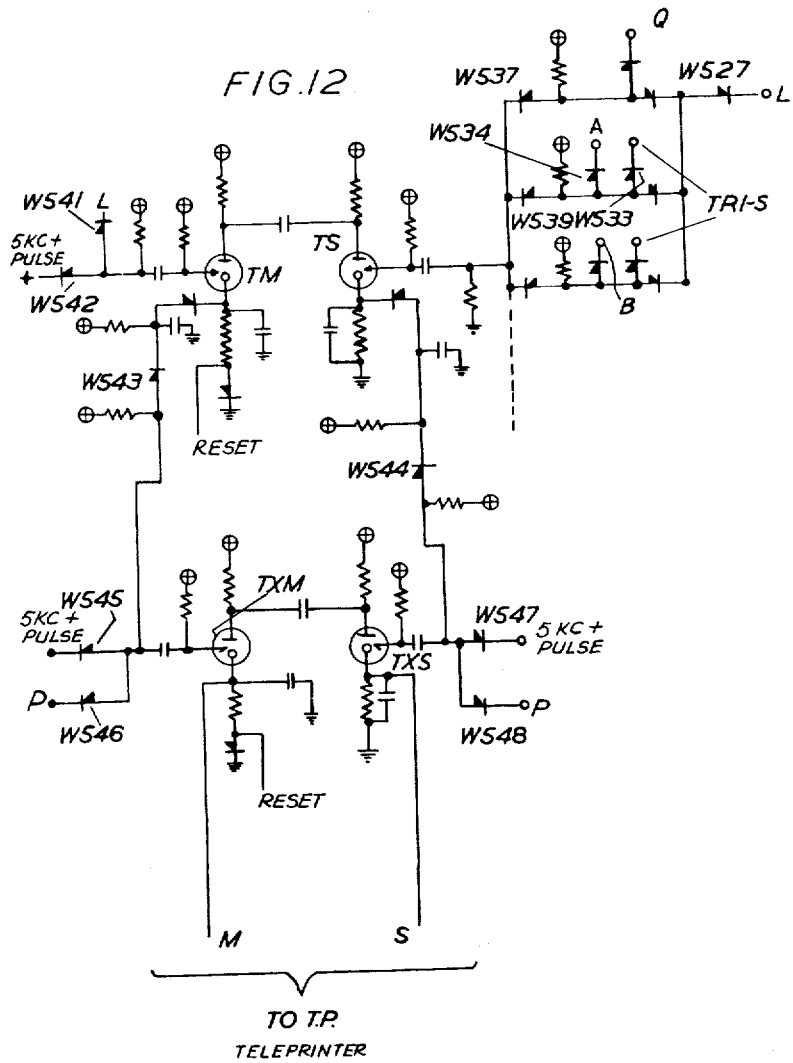

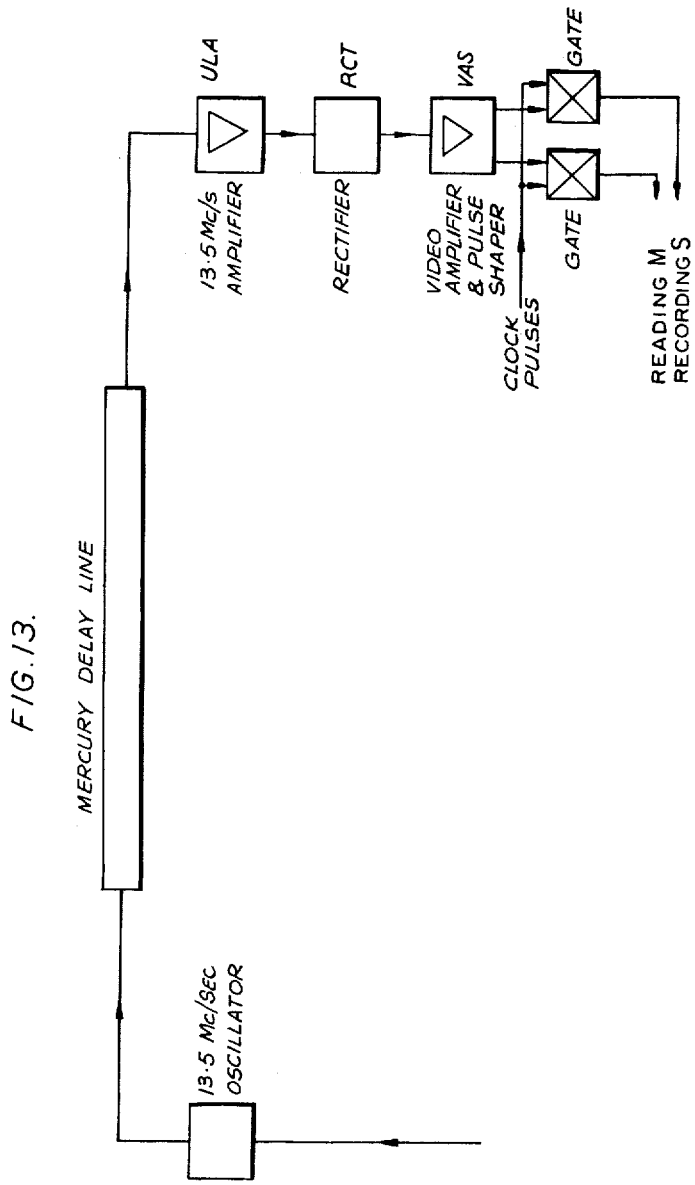

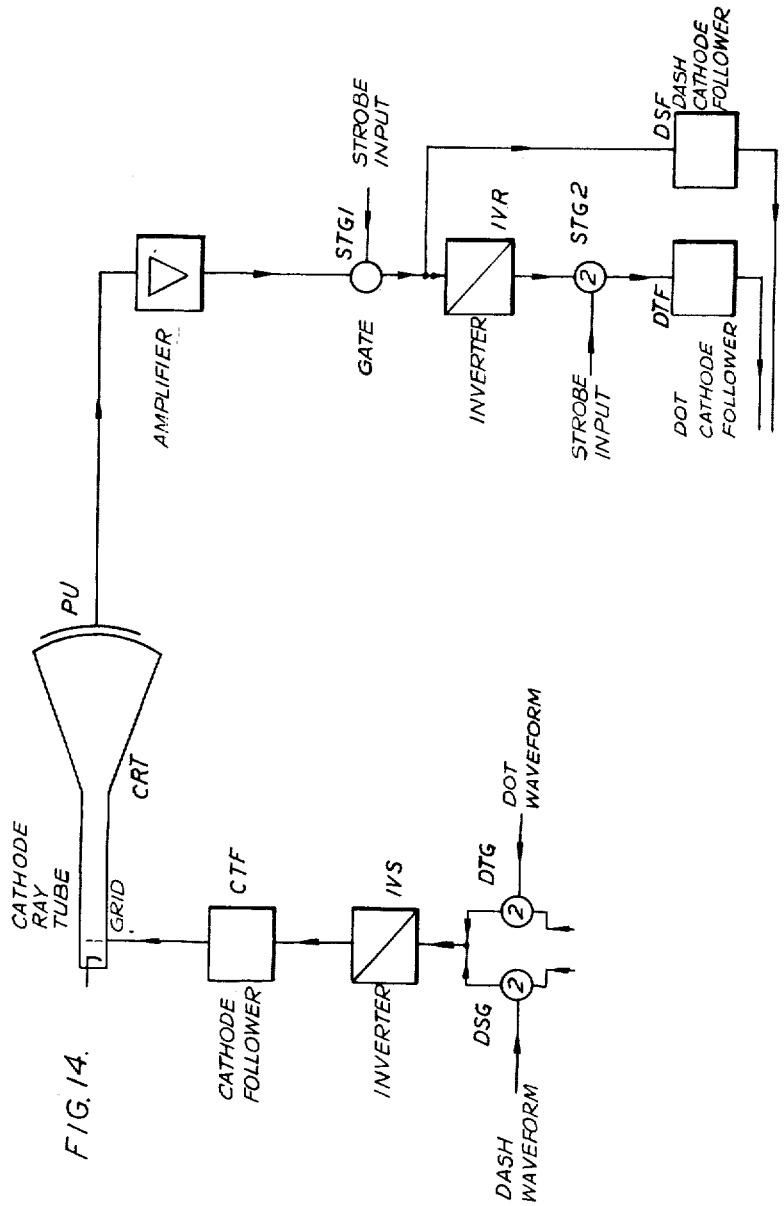

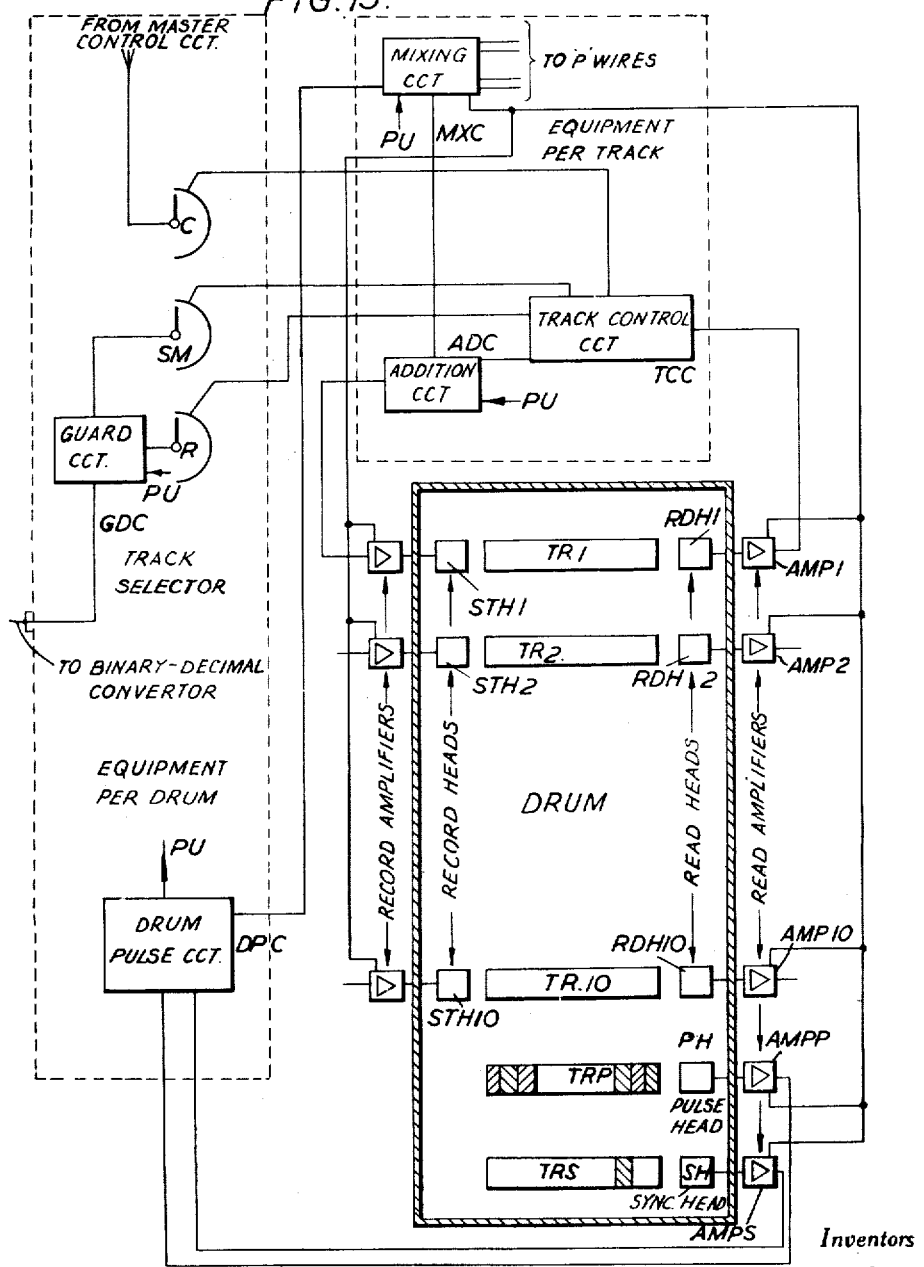

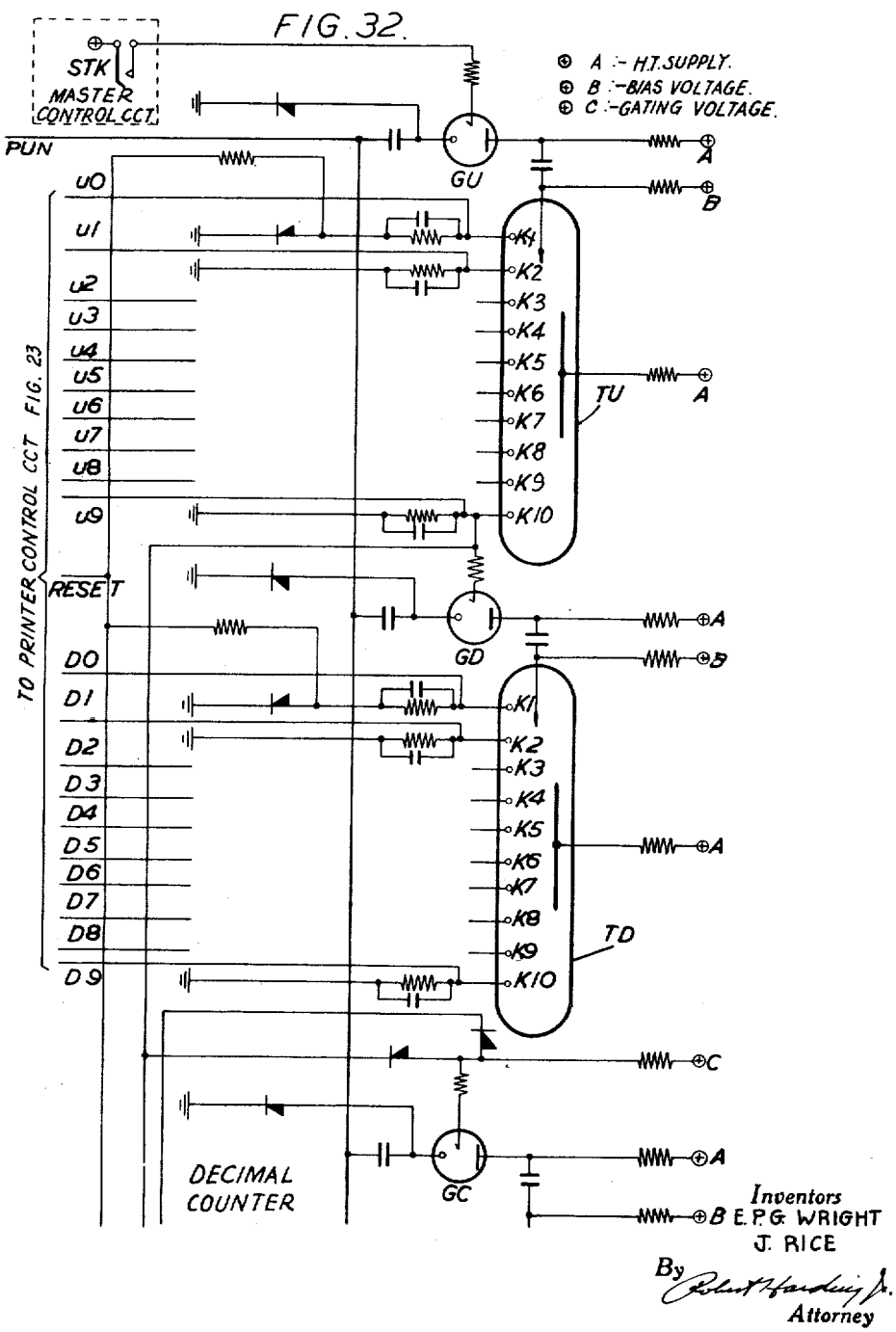

United States Patent Office 2,838,745
Patented June 10, 1958

2,838,745
METHODS OF RECORDING AND/OR MODIFYING ELECTRICAL INTELLIGENCE

Esmond Philip Goodwin Wright and Joseph Rice, London, England, assignors to International Standard Electric Corporation, New York, N. Y.

Application May 22, 1952, Serial No. 289,383

Claims priority, application Great Britain May 23, 1951

22 Claims. (Cl. 340—174)

This invention relates to electrical storage of information.

The object of the invention is to provide improved means for modifying information stored on a binary basis.

The main feature of the invention comprises equipment for the storage of information in binary elements, which includes means for reading a piece of stored information element by element, means for modifying said information element by element as desired and means for restoring said information element by element, whereby a piece of information can be read, changed, and re-stored one element at a time in turn.

The storage equipment can be of any suitable kind, such as magnetic line recorders, e. g. tape or drum; sonic delay line stores, e. g. mercury delay lines; position storage tubes, such as deflector type cathode ray tubes; electromagnetic transmission line stores, such as the resistance-capacity lines used in radar; electromagnetic delay line storage, such as gas tube, hard valve, saturated core, and other pattern movement devices. Examples using magnetic drums, mercury delay lines, and cathode ray tubes respectively, will be described with reference to the accompanying drawings in which:

Fig. 1 shows a general schematic diagram of one embodiment of the present invention;

Fig. 2 represents in time relationship certain of the controlling waveforms encountered in the arrangement of Fig. 1;

Fig. 3 shows a more detailed schematic diagram of the circuit arrangement of Fig. 1 for reading stored intelligence, modifying it and storing the modified intelligence;

Fig. 4 shows the waveforms encountered in the circuit of Fig. 3;

Fig. 5 shows a modification of the circuits of Fig. 3, while

Fig. 6 shows circuits for use in recording a stored number from a reading head on a teleprinter via a binary-to-decimal converter;

Fig. 7 shows the waveforms encountered in the circuits of Figs. 5 and 6;

Fig. 8 shows a binary-to-decimal converter;

Figs. 9 to 12 show circuits for converting decimal records into teleprinter code for printing;

Fig. 12A shows the wave forms encountered in the circuit of Fig. 11;

Fig. 13 shows a schematic circuit of an embodiment of the invention using mercury delay line storage, while Fig. 14 shows a schematic circuit of another embodiment of the invention using cathode ray tube storage;

Fig. 15 is a schematic layout of the equipment required for recording metering information on a magnetic drum and for changing and reading off such information;

Figure 19:
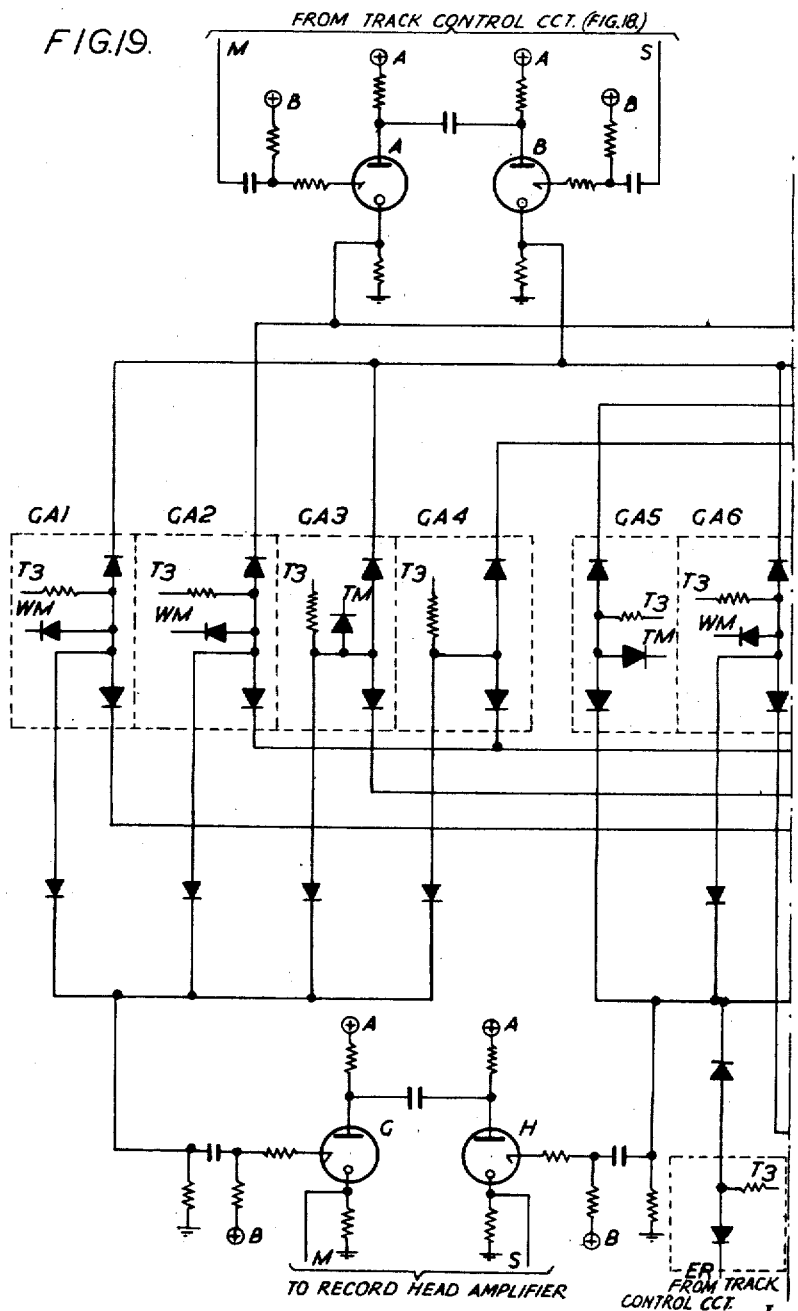
Figure 20:
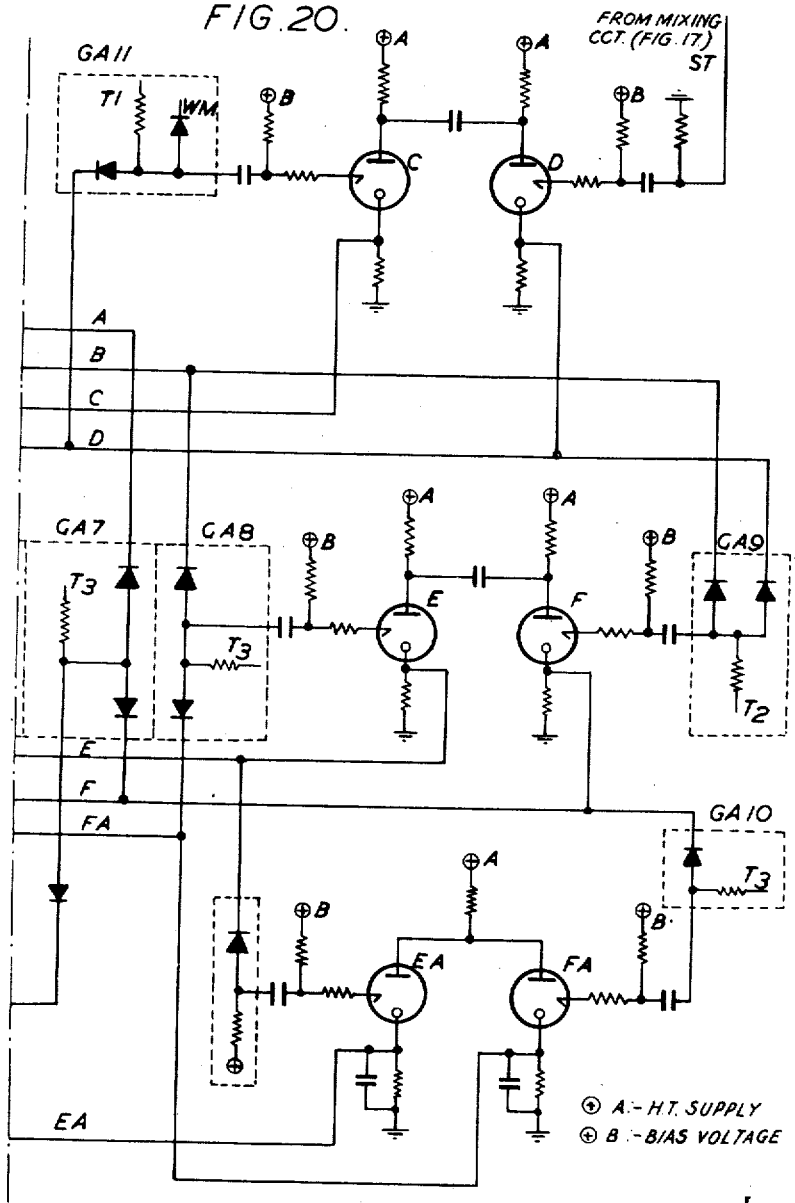
Figure 21:
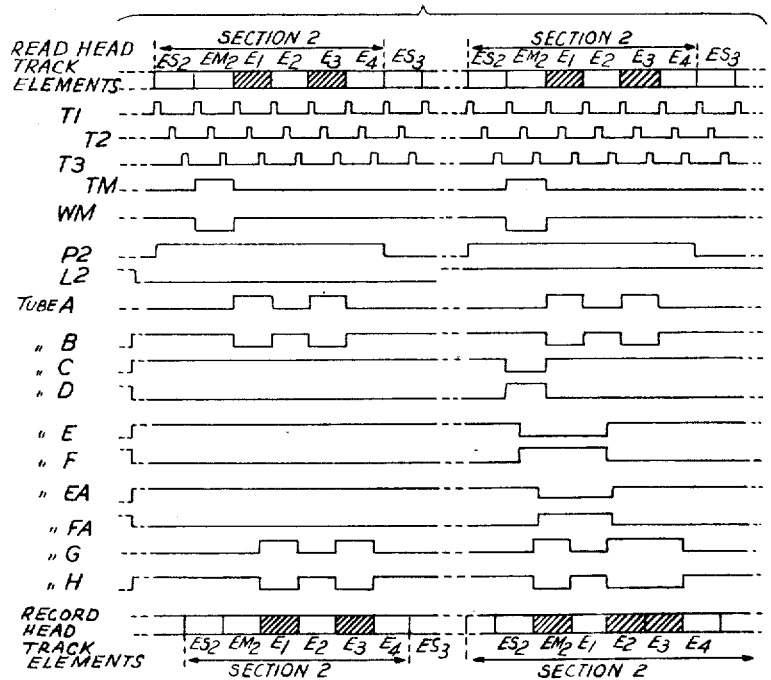
Figure 22:
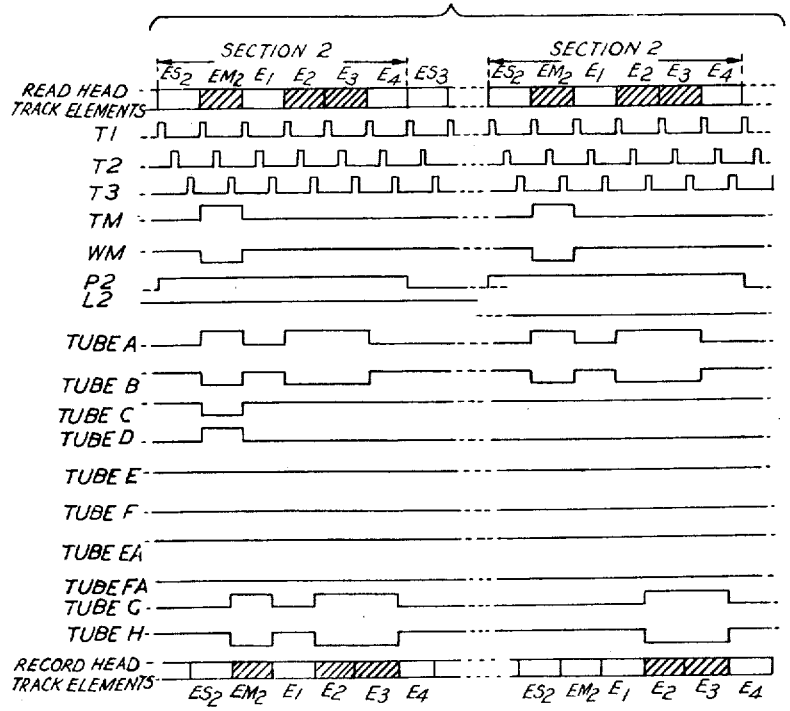
Figure 23:
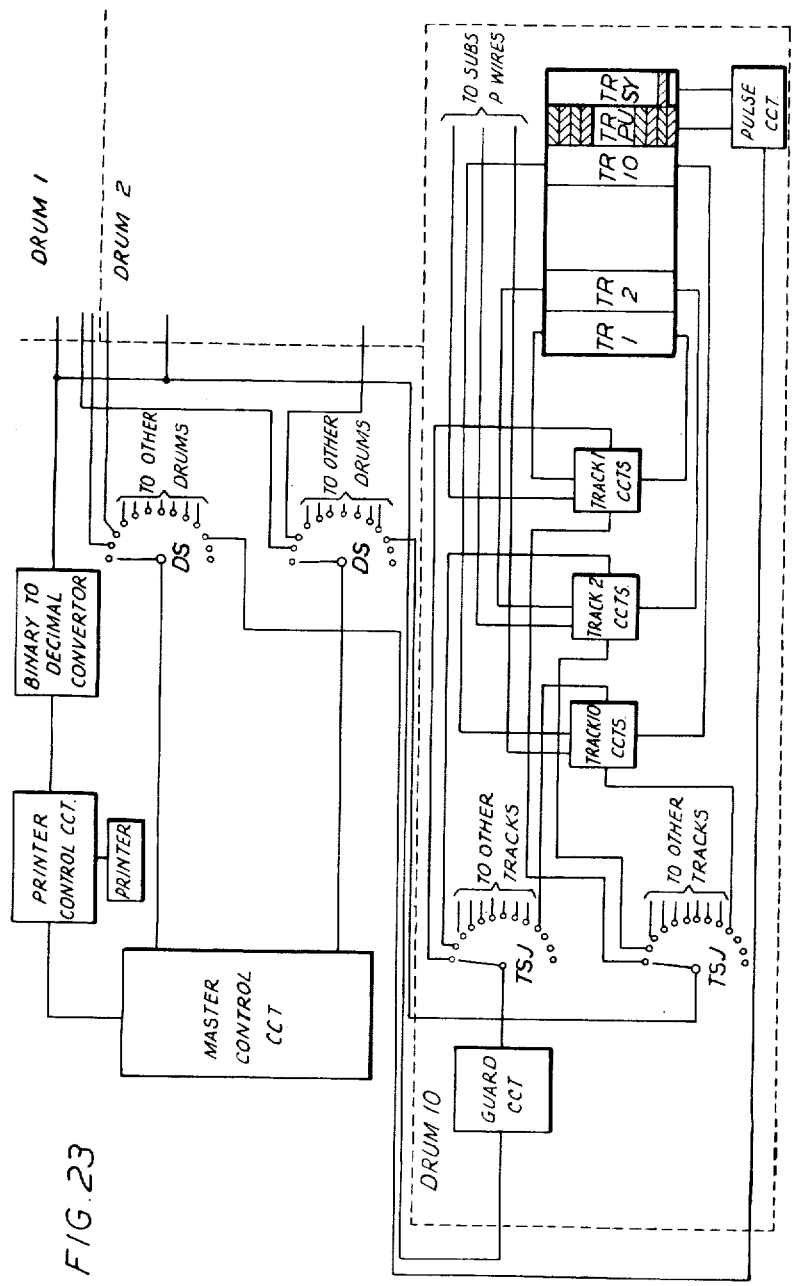
Figure 24:
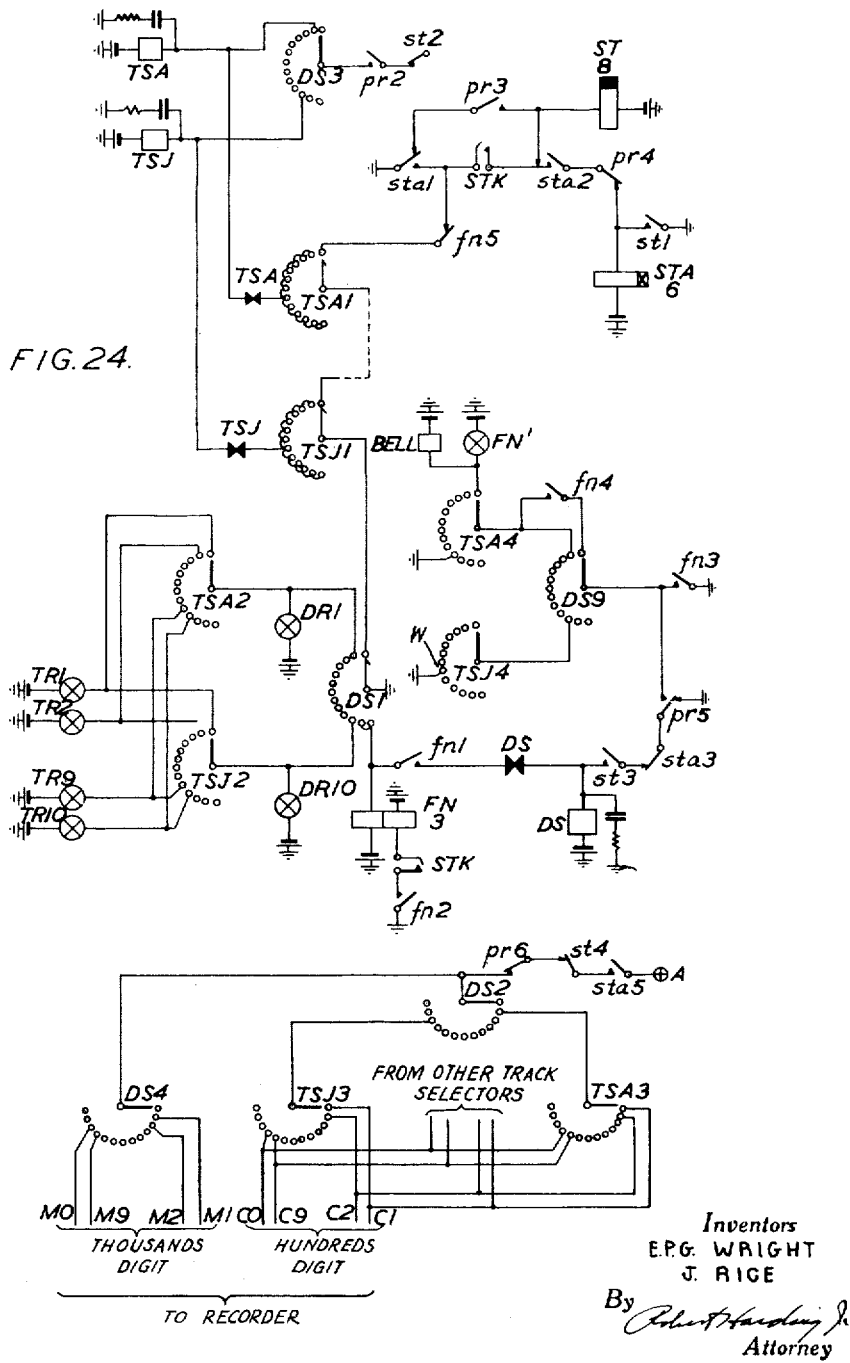
Figure 25:
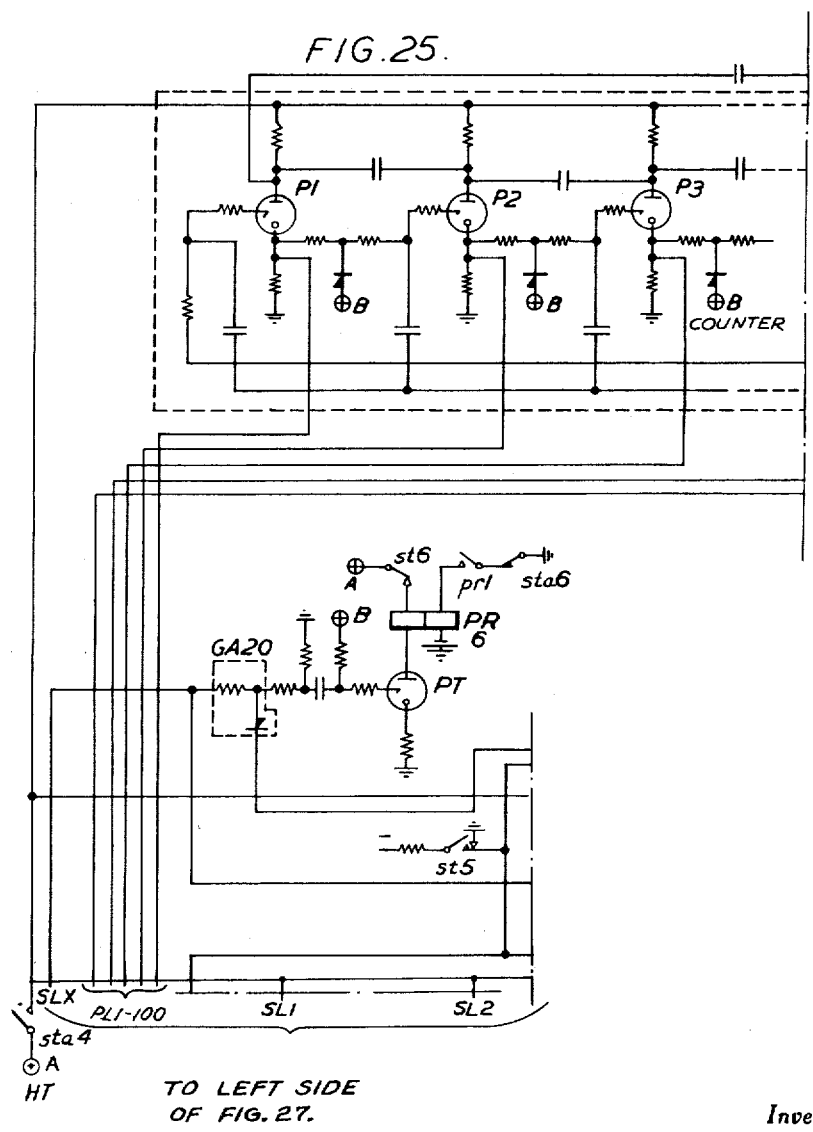
Figure 26:
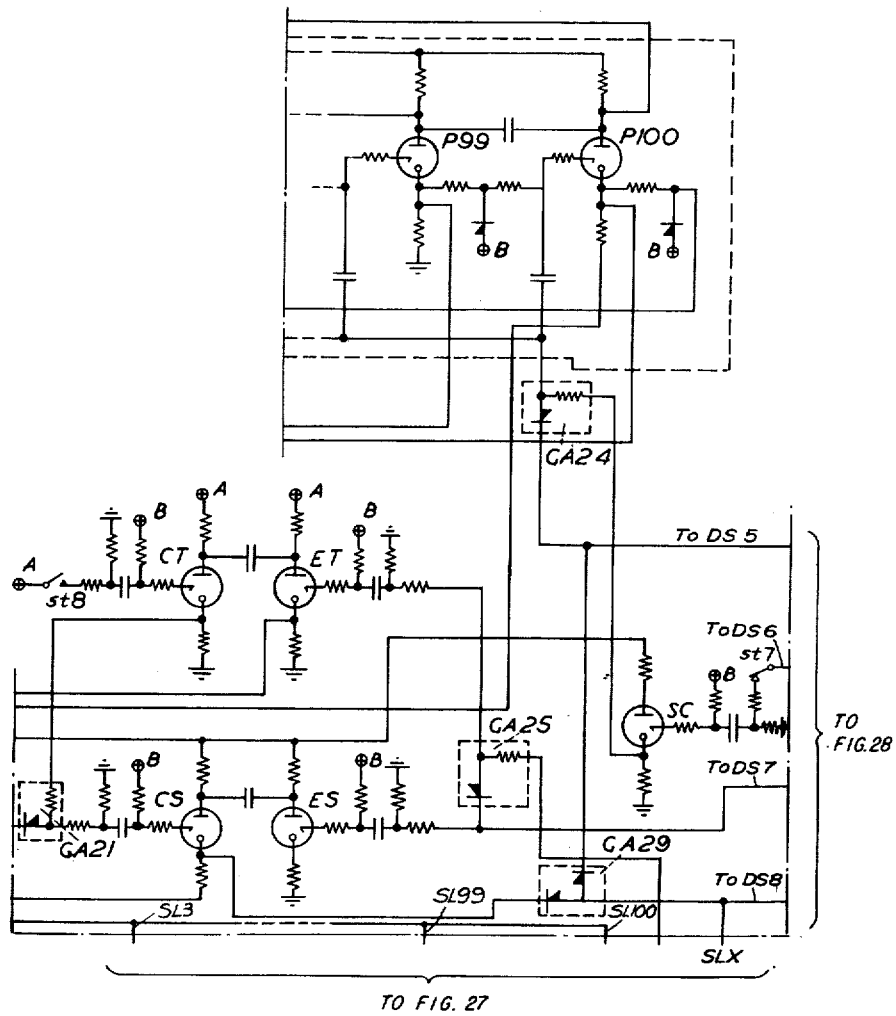
Figure 29:
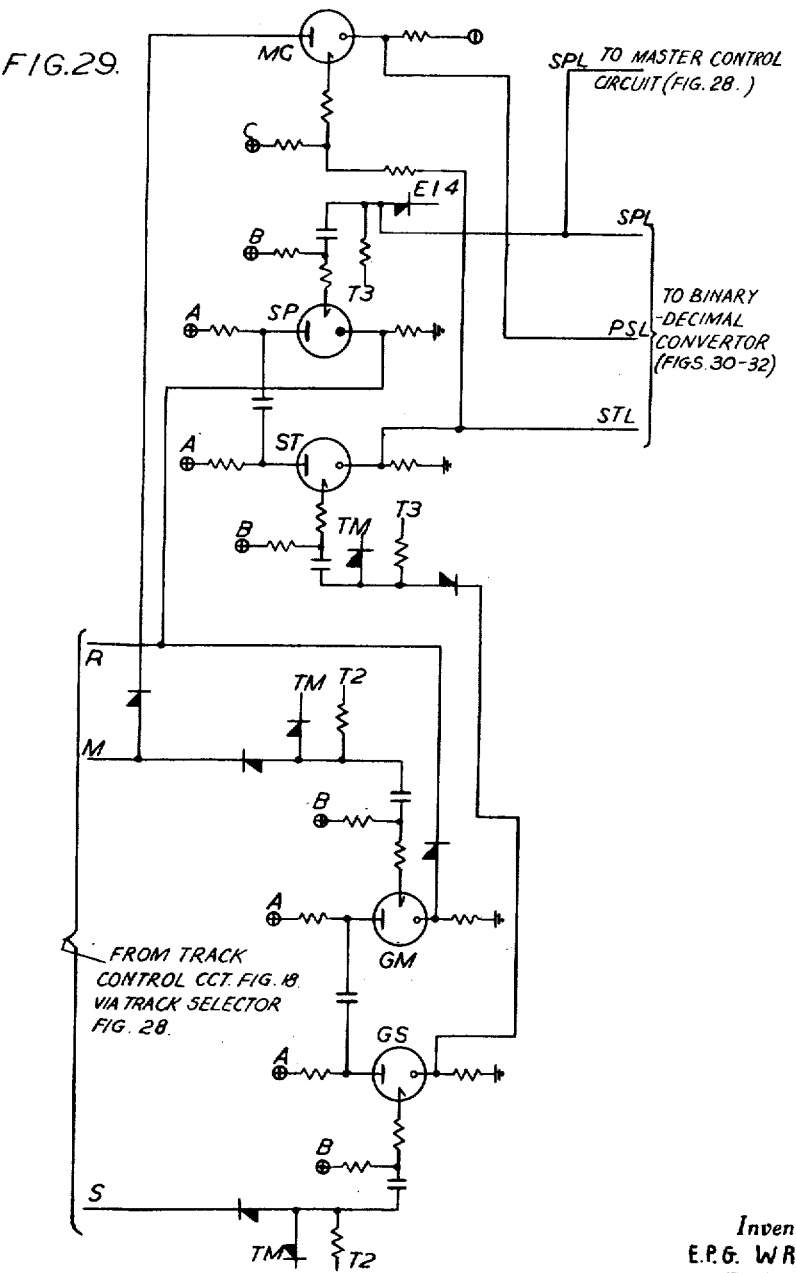
Figure 30:
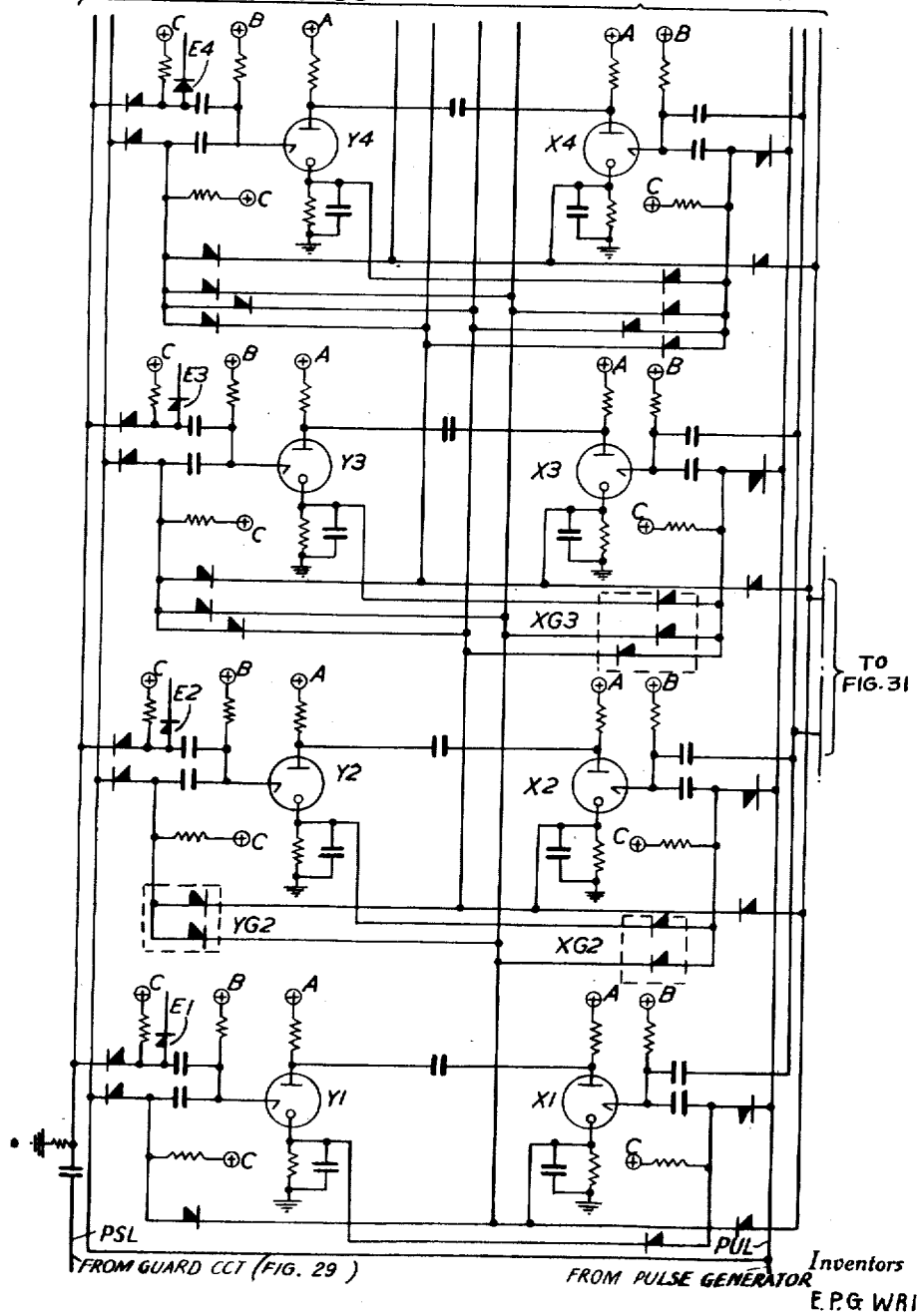
Figure 31:
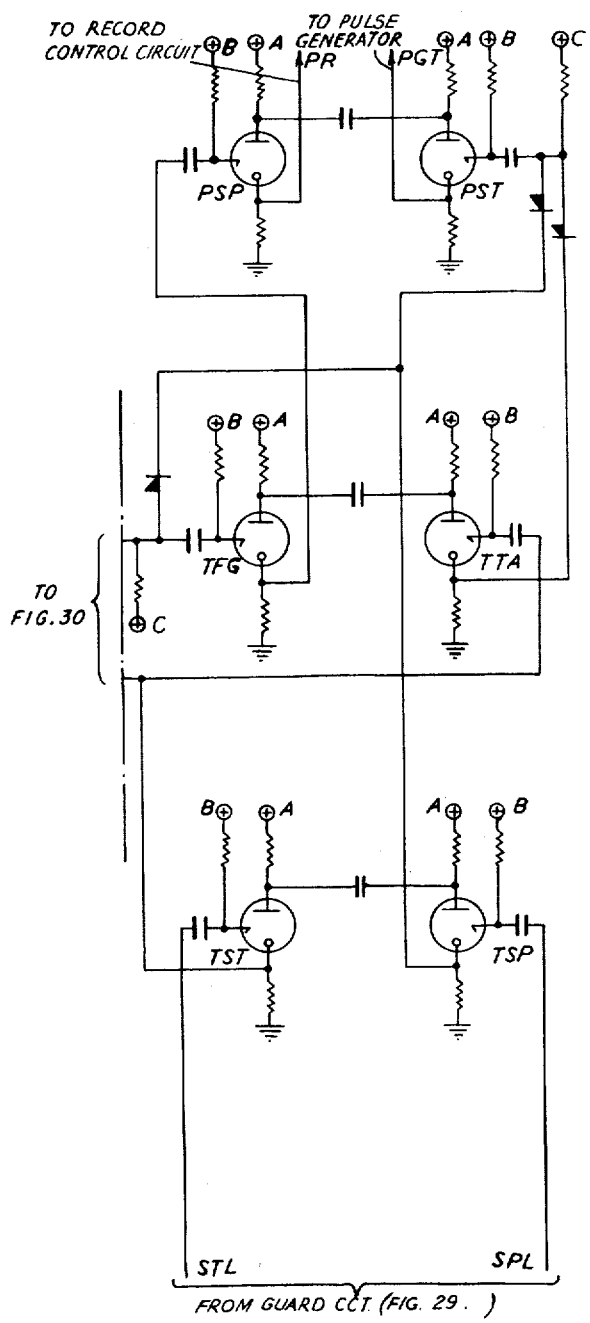

Figs. 19 and 20, which should be placed side by side with Fig. 19 on the left, together show an additional circuit one of which is provided for each magnetic track;

Figs. 21 and 22, which should be placed side by side with Fig. 21 on the left, show the operation chart for the addition circuit of Figs. 19 and 20;

Fig. 23 shows a schematic layout for metering equipment comprising several drums;

Figs. 24–28, show the master control circuit for a group of drum metering circuits;

Figs. 24–26 and 28 should be arranged side by side from left to right in ascending order of numbers with Fig. 27 below Figs. 25 and 26;

Fig. 29 shows a guard circuit, only one of which is provided per drum;

Figs. 30 and 31, which should be placed side by side, and Fig. 32, together constitute a binary-decimal converter.

Fig. 1 is purely schematic, and all the different electronic circuit tools are indicated by rectangles with a schematic-indication in some cases of their purpose. For instance, a flip-flop is two rectangles side-by-side, a counting circuit is a series of rectangles, and so on. One storage track of the magnetic drum is shown as a circle with reading and storage heads RDH, STH. The single section-marker track or item marker track of the drum with its spaced teeth is shown at MKT, and the element marker track with one tooth per element position at ELT. Electronic gates are indicated by small circles with a plurality of incoming leads and an outgoing lead: the figure, e. g. 2, inside the circle STG indicates that coincidence of potentials on that number of incoming leads is required to open the gate and apply potential to the outgoing lead.

Fig. 3 is a more detailed circuit diagram of the arrangement of Fig. 1, excluding the control-pulse-producing devices and the counting circuit, but here again the circuits of some well-known electronic circuit tools have been indicated by illustrative symbols instead of the complete detailed circuits, many examples of which are known to electronic engineers, each of whom will have his own preference among the various well-known types. Thus a flip-flop is shown by two circles illustrating tubes joined by an arc representing the anode circuitry, horizontal leads representing the grid control circuitry, and vertical bottom leads indicating the cathode circuitry. Most of the flip-flops shown are controlled by rectifier gates of well-known type of which examples are shown in Proceedings of the Institute of Radio Engineers, May 1950, in an article on "Diode Coincidence and Mixing Circuits in Digital Computers" by Tung Chang Chen. These gates are shown as being controlled by time-position pulses derived from the item marker track MKT and the element marker track ELT of Fig. 1, such pulses being illustrated in Fig. 2, and by the various tubes of the flip-flop. Again, the exact way in which a tube applies a potential to a gate is not shown, as this is commonplace in the art and each engineer has his own preference. Thus, considering tube G, its control lead is connected to three different gates: one controlled jointly from the cathode of tube E, from the cathode tube D, and by time pulse $t_3$ which occurs in every track element position; a second gate controlled jointly from the cathode of tube E, from the cathode of tube A, and by time pulses $W_{M1}$ and $t_3$; and a third gate controlled from the cathode of tube F, from the cathode of tube B, and by time pulse $t_3$. In connection with tubes E and F, two points $F_X$ are shown which are assumed to be joined together.

The control lead of tube E is connected to a gate controlled jointly from the cathode of tube B, the FX circuit connected to the cathode of tube F, and by time pulse $t_3$. The control lead of tube F is connected to a gate which is controlled jointly from the cathode of tube D, the cathode of tube B, and by time pulse $t_2$. The control leads of tube D can be activated by any one of N gates, each controlled jointly by time pulses $t_1$, $t_M$ in a different track section time position, as determined by one of pulses P1 . . . PN, and also from a condition signal corresponding to the particular track section on the corresponding one of the leads CL1 . . . CLN.

In Figs. 5 and 6, the same general principles are used of denoting well-known electronic circuit tools by symbols instead of by their detailed circuits, but a slightly more formal representation is used. It is considered that the transition through the symbols of Fig. 3 to those of Figs. 5 and 6 will be clear. The symbols of Figs. 5 and 6 are being adopted by the British Post Office and Ministry of Supply for use in electronic circuits. The tools are shown; namely, gates of the type used in Fig. 1, comprising a circle with inputs and an output and an interior figure indicating the number of inputs on which coincidence is required for the gate to open. The interior figure of a gate may be equal to or less than the number of inputs. Flip-flops are shown as double rectangles, with two control leads and two outputs, while as before a counting circuit consists of a number of side-by-side rectangles representing stages, with an end input, and an output at each stage.

The invention is applicable among other things to telecommunication exchange systems, for instance for subscribers' metering, or for register controllers or register-translators.

It is also applicable, for instance, to seat booking systems, for instance for aircraft or railway services, theatres, etc.

Each embodiment comprises a storage medium with storing and reading heads and means between said heads for modifying information passing from the reading head to the storing head. The modification can be by way of addition, subtraction or other mathematical operation.

In the first embodiment of Figs. 1 and 3, the device to be used for storing a plurality of items of information is a rotating magnetic drum. On the surface of the drum are a number of parallel tracks, the tracks going round the periphery of the drum. The number of tracks on the drum is dependent upon the storage requirements. Each track has a read head and a storage head, the two heads being connected together via electronic control equipment.

A track may be considered as composed of a number of element positions. In practice it is possible to have up to 150 elements per inch round the periphery. For example, a drum of 2 inches diameter, i. e. approximately 6 inches circumference, may have 900 elements per track and, if the maximum value to be stored for the individual items of information requires 20 elements arranged in binary form, the track may be used for storing 45 independent items in 45 successive sections around the track. For additional independent items the number of tracks would be increased accordingly and separate heads and control equipment added. Consider another example in which the maximum item to be stored is the decimal number, 10,000, and the number of individual items is to be 1,000. Using a binary method of storage, any decimal number up to 10,000 may be represented by using 14 binary elements. If it is desired to have 100 items per track, the required elements per track will be 1,400 and, using a packing of 100 elements per inch of periphery, the circumference of the drum would be 14 inches (approximately 4½ inches diameter). Ten such tracks would be required, and if the tracks have a separation of ½ inch between centres, the axial length of the drum would be approximately 6 inches. Each track would have its own read and store heads and control equipment.

The read head RDH, Fig. 1, reads in turn the elements passing the read head and transfers them either directly or after suitable modification to the store head STH which would cause the original or modified value to be recorded. The two heads are preferably placed diametrically opposite on the same track, which means that two independent element trains on the track must be allocated for each individual item. It would be possible to arrange the heads so that a new storage was overprinted on the original position, but it is considered that by using two positions the control equipment may be simplified. The heads may be placed in any other suitable relative positions.

Fig. 1 is a schematic drawing of the first embodiment, showing the equipment required for one track on the magnetic drum. An item marker track MKT, common to all the storage tracks, is provided on the drum to give the starting positions for the various storage sections. This track has permanently magnetised element positions coinciding with the first elements of the storage sections on the storage tracks. Such elements may be provided by toothlike projections made on the periphery of the marker track which is then magnetised. The heads are mounted so that they are just clear of the drum.

The output from the marker read head MRH produces a marker pulse $t_M$ each time a tooth on the drum passes the head, which pulse is amplified by the marker amplifier and used to operate a position counter PC which has one position for each storage section on the storage track. The position counter PC has outputs P1 . . . PN, one for each position, and the counter applies potentials in succession to these outputs in response to the receipt of a succession of marker pulses $t_M$. Such a counting circuit is well known. The outputs P1 . . . PN from the position counter PC are used to scan in turn the input leads CL1 . . . CLN to the condition flip-flop CNF. To this end the outputs P1 . . . PN are connected respectively to gates in the input lead circuits, each of which gates can only open to permit a potential on the associated input lead CL1 . . . CLN to affect the condition flip-flop when a potential appears on the corresponding P1 . . . PN output. The control circuit used will depend upon the particular application for which the equipment is to be used. It may be required, for instance, to add 1 to a value read by the read head whenever a condition signal appears on the relative control lead e. g. CL1, or to pass on the previous value if the condition signal is absent. Alternatively, it might be required to add or subtract any required figure signalled via the input leads. In this case the control circuit would be similar to the converter arrangement described in our copending U. S. patent application Ser. No. 198,326, filed November 30, 1950.

The rotational speed of the drum must be such that all condition leads CL1 . . . N are scanned in the time of the shortest conditional control on the said leads. For example, in a subscriber metering application for a telephone exchange, a metering condition appears on the subscriber's P-wire for not less than 250 milliseconds. Thus all the independent values on one track must be scanned in not more than 250 milliseconds. It is proposed to read the values on one part of the track and transfer them, modified or direct, to the opposite part of the drum. This means that one half only of the drum periphery must be scanned in the control signal time; the speed of the drum must be not less than $$\frac{1,000}{250 \times 2} \times 60 = 120 \text{ R. P. M.}$$

Fig. 1 shows by way of example, an addition control flip-flop ACF controlled by the condition flip-flop CNF. A resultant flip-flop RSF is controlled jointly by the reading flip-flop RDF and the addition control flip-flop ACF.

The output from RSF passes to two gates STG, OTG which are so controlled that the recording can be directed, as required, to the storage head or the output or "read-off" circuit, or both. If the storage gate STG is open, the output from RSF passes to the storage head STH, again storing the item. However, when it is desired to read off any particular section of the track, the output gate OTG is opened during the time the required item is passing the read head and the output from RSF passes to the output circuit, which may be used to record the item. From here the treatment depends upon the application. The item, which will be in binary form, may be converted to decimal form and a recording made in a manner analogous to the reconversion and recording process described in the above-mentioned patent application No. 198,326.

Alternatively the output could be converted to decimal form and used to transmit decimal trains of pulses to a switching train, or could be used to provide an audible announcement.

Whilst the storage gate STG is closed, the storage head STH could be used to wipe out the section of the track passing at that time, thus providing a zeroising system or, if it is desired, the original item could be left in situ.

The detailed operation of the flip-flops and gates will be described in connection with Fig. 3.

In general the control signals on the condition leads CL1 . . . N will not be synchronised to the rotation of the drum, and so a means must be provided to prevent more than one modification being made to a stored item during one application of the control. This is accomplished by using one extra element position per storage section of the track and using this element to provide the information that a modification has been made and no further modification is to be made until the control is removed and a new control appears.

An extra track, the element track ELT, is provided as a means of supplying the various pulse supplies for the control circuit; this track is common to all the storage tracks on the drum. Round the periphery of this track are permanently magnetised toothlike projections, there being one projection for each element position. The output from the element read head ELH passes to a clock amplifier CLA and a pulse former PUF1 to provide $t_1$ pulses in the initial one-third of an element duration. The $t_1$ pulses pass both to a pulse output and to a delay device PUF2, giving a one-third of an element delay and producing a $t_2$ pulse which passes both to a $t_2$ pulse-lead and to a second delay device PUF3, which gives another one third of an element delay and produces $t_3$ pulses. Reading from the drum takes place during time $t_1$ and recording on the drum takes place during time $t_3$.

Fig. 2 shows the pulse and waveform relationship for two storage sections of a drum.

The marker track, as previously described, supplies a pulse $t_M$, coincident with the first element $E_M$ of each storage section and also an inverted waveform of $t_M$, namely $W_{M1}$, for use in the control circuit. Pulse $t_M$ is also used to step the position counter PC which, therefore, will make one step at the beginning of each storage section.

The output from the read head passes to a balanced amplifier BA, Fig. 1, and from there to a reading flip-flop RDF. The latter will take up one position for one direction of magnetisation of an element and the other position for the reverse magnetisation. The reading flip-flop will give element by element the existing item on the drum. The condition leads CL1 . . . CLN are examined in turn, the particular one being examined being determined by the output of the position counter PC, as indicated by the gates controlled by the leads marked $P_1$, PN, and by the condition leads CL1, CLN. The condition flip-flop CNF will be operated accordingly. If the lead under examination shows no signal, the flip-flop will be set to one position, and if a signal is found on the condition lead, the flip-flop will be set to the other position. The output of the condition flip-flop CNF is used to control an addition control flip-flop ACF. The latter is so arranged that the first time a control condition for a particular recording is found on the corresponding condition lead CL1 . . . N it will be set to one position, but thereafter it passes out of control of the condition flip-flop CNF until the condition on the associated lead disappears. This is accomplished by using the output from the reading head RDH produced by the element $E_M$ on the storage track which is used to record whether or not an addition has been made for a received signal on the condition lead. The operation is given in more detail in connection with Fig. 3.

The addition control and reading flip-flops ACF, RDF together control the resultant flip-flop RSF. The arrangement is such that when no addition or subtraction has to be made, the resultant flip-flop is set according to the output from the reading flip-flop and the previous value is transferred directly from the read head to the storage head. However, when a modification has to be made, the resultant flip-flop will be set according to the outputs of both the reading and addition control flip-flops. It should be understood that it is possible to make use of complementary values so that subtraction becomes simply an addition process.

In Fig. 2 the element positions $E_{M1}$, $E_{M2}$ on the storage track are the elements used to denote in respect of storage sections 1 and 2 that an operation has been carried out for a corresponding control signal on the condition lead. Further, the long pulses P1, P2, indicate the duration of the pulses from successive outputs of position counter PC, each P pulse encompassing the whole of the reading time of a storage section, e. g. $E_{M1}$, $E_1$ . . . $E_{64}$, Fig. 2. $E_{M1}$ is shown to be positive which indicates that the section of the track associated with $P_1$ has had a modification performed on it and no further modification will be permitted until $E_{M1}$ has been removed. This removal will be effected the first time a scan is made and it is found that the condition signal on the corresponding condition lead CL1 has been removed. On the other hand $E_{N2}$, being zero shows that suitable modification can be made on the second section of the track when the control condition appears on the pertinent condition lead CL2.

A series of elements denoting a number appears with the element of least significance first.

The means for either re-storing on or reading off a particular section of track will now be described. The outputs from the position counter PC are fed to a gate control circuit GCN. To the same circuit are connected position-required leads. Normally when re-storage is taking place the position-required leads will be neutral and the gate control will be set so that the storage gate STG is open and the output gate OTG is closed. When it is desired to read off a section of the track, the associated position-required lead is given a signal from an external source, and when the position counter PC reaches the desired position, a waveform is generated by the gate control circuit GCN to open the output gate OTG for the desired time. The storage gate may be left open or it may be closed according to the requirements. The section of the track required will be registered in the output circuit and may be used in any desired manner.

Fig. 3 illustrates a method by means of which 1 may be added to the previously recorded values, say, for a metering application, and Fig. 4 shows the waveforms generated in making this addition. It is assumed that the original recording is 5, i. e. 0101 in binary form, the addition of 1 making the new recording 6, i. e. 0110. For the metering case the condition leads CL1 . . . N would be the subscribers' P-wires.

The reading flip-flop A, B, is set according to the output received from the read head via the balanced amplifier BA: it is shown in Fig. 3, with B conducting. In the example shown in Fig. 4 a control condition appears on the condition lead CL1 for the first section of the track prior to the arrival of the first section at the read head.

Referring to Fig. 4, initially tube C of the flip-flop C,D; tube E of E,F; and tube H of G,H, are conducting. When the position counter applies a pulse to lead $P_1$, denoting that the first section of the track is to be examined, at a time given by $t_M$ and $t_1$ Fig. 2, D, Fig. 3, will become conducting and C will no longer conduct. This is due to the coincidence of potential conditions on the four leads of the rectifier gate $t_1$, $t_M$, $P_1$, Cl1, and the consequent application of operating potential to the grid of tube D. Since no previous addition has been made for this control, pulse $E_{M1}$ will be absent and tube B will remain conducting. At time $t_2$ during $t_M$, potential coincidence will occur at gate D,B, $t_2$ to operate tube F and stop tube E. At a time given by $t_3$, Fig. 2, G will conduct, under control of the gate provided by F, B and $t_3$, and an $E_{M1}$ pulse is recorded by the storage head. A resistance-condenser network FX connects the cathode of tube F to a control point FX of a gate connected to the control electrode of tube E. The potential via network FX does not rise sufficiently during time $E_{M1}$-$t_3$ for the control gate of tube E to become effective. This is to prevent the changeover of EF during the $E_{M1}$ interval of time, since the purpose of EF is to effect addition.

At time $E_1t_1$, when the first element 1 of the first item 0101 is read, C will conduct once again due to potential via the gate controlled by tube D in time $t_1$ and the removal of the $t_M$ pulse from the $t_1$, $t_M$, P1 gate. Thereafter CD will operate as described in succeeding $P_1$, $E_{M1}$ time positions when the first item is again being read, so long as the control remains on lead CL1.

In time position $P_1$, $E_1$, tube A of flip-flop A, B operates and B releases, since element 1 is a mark M. Flip-flop EF remains in the same condition, that is, with E conducting, because without tube B being operated the gate controlling tube E cannot open.

At time E1, $t_3$, the reading flip-flop having been set with A conducting, indicating that element 1 is present, tube H will become conducting under control of the gate provided by F, A and $t_3$. This means that the first element is to be reversed, which is the condition required for the addition of 1. In time period $P_1$, $E_2$, flip-flop A, B, changes over and B is conducting, denoting that element 2 is a space and tube G will conduct under control of the gate F, B and $t_3$, denoting a mark. Again there is a reversal from the element read by the read head; a space has been read by tube B, and a mark will be recorded by tube G. The same $t_3$ pulse will cause tube E to conduct by means of gate B, $F_X$ and $t_3$. This is in accordance with the requirement that when 1 is added to a binary number all elements up to and including the first zero must be reversed but thereafter no change is made. Thus F, which when conducting causes the elements to be reversed, must be extinguished after the first zero, which was identified by the operation of tube B, has been changed to 1.

When the next $t_3$ pulse arrives, in time period $E_4$, A is conducting, showing that element 4 is a mark. Now, since F is not conducting, G will remain conducting. Thereafter for the remaining elements in that section of track, G will conduct whenever A is conducting and likewise H will conduct when B is conducting, controlled by gates E, A, $W_{M1}$, $t_3$ and E, B, $W_{M1}$, $t_3$. The waveform $W_{M1}$ is used in the two gates in question controlled by tube E, so that GH is controlled directly by AB only when the elements of an item are being read by the read head, these gates being inoperative during the condition elements $E_M$ for which separate control gates are provided as described above. When all the elements of the item have been read, the new number as recorded by the record head will be 1 greater than the original, and furthermore, the element $E_{M1}$ has been added. The condition flip-flop now passes under control of the second condition lead CL2 due to the position counter PC passing to the next position, and as the drum rotates the other CL leads will be scanned in turn. These corresponding items will be transferred as required to the other side of the drum, either changed or unchanged, according to the presence or absence of signals on the corresponding CL leads.

After half a revolution the modified first section will again be presented to the read head, and again the position counter will step to position 1. The condition flip-flop C, D, is again controlled by condition lead CL1. Since the condition still persists, D will again become conducting at a time given by $t_M$ and $t_1$. This time, however, at time $t_2$ there is a mark in time position $E_{M1}$, so that B will not be conducting and the gate controlling F will not be operated. Thus E remains conducting. At time $E_{M1}$, $t_3$, tube G will conduct under control of the gate E, D and $t_3$, and the $E_{M1}$ mark will be transferred. For the remainder of the recording G and H will become conducting as for A and B owing to the two gates E, A, $W_{M1}$ and $t_3$; and E, B, $W_{M1}$ and $t_3$; respectively, i. e. the item read by the read head will be transferred directly to the storage head. This procedure will be repeated until the next time the first section arrives at the read head after the signal has disappeared from the condition lead CL1. This time D will not become conducting at the time given by $P_1$, $t_M$ and $t_1$. At time $t_3$, tube H will become conducting under control of the gate C, $t_M$ and $t_3$, thus removing the $E_{M1}$ mark. For the remainder of the recording, at time $t_3$, tubes G and H will again be conducting according to A and B respectively, and the item will be transferred direct. Thus the original stored number 5, i. e. 1010, has been changed to 6, i. e. 0110, and this section of the track is ready for another control signal to appear on condition lead CL1.

It should be noted that the two heads are so located that as a reading is transferred, the previous reading then passing the record head is overprinted.

Although the arrangement of Fig. 3 has been described more in conformity with gas tube circuits, the flip-flops may in fact consist of hard valves or magnetic flip-flops or any such like devices.

The telephone message registration system shown in Figs. 5, 6 and 7 constitutes a second embodiment of the invention; it is substantially the same as the system described above, the only modifications being in respect of the gating arrangements for transferring or reading off information. Furthermore, recording equipment for read-off information is described.

It has been assumed that each subscriber requires 14 binary elements for registering purposes with an additional element to designate that an existing metering signal has already been acted on. Each "memory" is to be capable of containing the information for 100 subscribers. The "memory" may take the form of a track on a magnetic drum, a cathode ray tube storage system, a mercury delay line, or any other suitable storage means. The necessary control pulses and waveforms illustrated in Fig. 7 are obtained by any suitable means such as those described above.

The description will be given in four sections:

(1) When neither metering nor reading off is taking place, that is, normal transfer.
(2) Metering, but not reading off, is taking place.
(3) Reading off, but not metering, is taking place.
(4) Reading off when metering is taking place.

The conditions for subscriber 1 only will be considered, the operation being the same for all other subscribers although taking place in a different time allocation.

1. Normal transfer (Figs. 5 and 6)

The counter PC is synchronised as previously described with the flow of the information from the memory, such that when section 1, allocated to subscriber 1, is passing the reading device, PC will have P1 energised and so on for other sections.

When reading off is not required, flip-flop F7, Fig. 6, has tube F7M conducting and tube F7N normal, so that gates G1 and G2, Fig. 5, allow information via leads 1, 0 from the memory reading device to pass to the reading flip-flop RDF. If a mark element indicating the value 1 is present tube A of RDF will conduct and if an element is a space, indicating the value O, tube B will conduct.

Gates G3, G4, controlling connection from the memory reading devices to the guard circuit, Fig. 6, are closed, since F7N, Fig. 6, is not discharging. Since no metering is taking place for subscriber 1, there will be no metering signal via the subscriber's line switch SLS (Fig. 5) and cut-off relay contact K; gate G5 will remain closed even when P1 is energised and tube D of the condition flip-flop CNF will remain conducting. Similarly tube F of the addition control flip-flop ACF will remain conducting. Thus, of the gates associated with storage flip-flop STF, it is possible for gates G10, G11, G12, G13 and G14 to open with the requisite condition of reading flip-flop RDF, together with G18 for the duration of the element EM1 but gates G15, G16, G17 cannot open.

Since tube D of CNF is conducting because no metering is taking place, when EM1 passes the reading device, G13 and G18 are opened for time $t_M$ and at time $t_3$ of $t_M$, G14 will open and cause tube H of STF to conduct, if not already conducting. Thus the storage device will cause a space metering element, EM1, to be stored. As the elements of section 1 pass the reading device, waveform $W_{M1}$ and tube F prepare gates G10 and G12 and these gates will open according to the setting of flip-flop RDF. If A is operated the three conditions for opening gate G10 are coincident. Potential via G10 is now coincident with that from tube M at time $t_3$ to open gate G11 and tube M operates. If B is operated, with F, in time $W_{M1}$, gate G12 opens, and in conjunction with tube M opens gate G13. Potential from G13 at time $t_3$ of $W_{M1}$ opens gate G14 and operates tube H. STF will be set according to RDF such that STFG will conduct for RDFB conducting and H will conduct for B conducting, that is, the information from the reading device will pass without modification to the recording device. As the last element E14 of section 1 passes the reading device at time $t_2$, a pulse is passed via gate G19 and PC steps to P2 in readiness for dealing with subscriber 2.

2. Metering without reading off

Again tube M of flip-flop F7 will be conducting, thus preparing gates G1 and G2.

When metering takes place a positive potential is applied on the metering wire from the switching circuit and received on the wiper of the subscriber's line switch SLS. At this time the cutoff relay contact K will be closed, so that a positive potential is applied to gate G5. When the section allocated to subscriber 1 is to be read, stage P1 of position counter PC is energised and gate G5 will open. In consequence at time $t_1$, $t_M$, gate G6 will open and tube C of CNF will be energised. Since no previous addition had been made for this metering signal, tube B of RDF will be conducting, because element EM1 will be registering space. At time $t_2$ of $t_M$ G7 will open, and tube E of addition control flip-flop ACF will be caused to conduct.

The intention now is to add 1 to the number taken from the reading device and pass the modified number to the storage device. Also, since this modification is to be made, it is necessary to add a mark element EM1, so that no further additions will be made for the same metering signal. Since both tubes B and E are conducting, gate G16 will be open. Thus at time $t_3$ of $t_M$ G11 will open and tube G of STF will be caused to conduct and a mark metering element EM1 will pass to the storage device. At time $t_1$, $W_{M1}$, that is the first $t_1$ pulse in the number storage proper, G8 will open and tube D of CNF will again be caused to conduct.

Now it is necessary to read and modify the digit elements. To add 1 to a binary number, starting at the least significant element it is necessary to reverse all elements up to and including the first zero. As before it will be assumed that before metering takes place the stored number for subscriber 1 is 0101, i. e. 5 and it is necessary to add 1 to make 0110, i. e. 6. Taking the least significant element first, the number 5 is stored as Mark, Space, Mark, Space on the drum by longitudinal magnetisation of reverse polarities.

When the first and least significant digit element E1 is read, tube A will conduct. Since at this time tube E is conducting and $W_{M1}$ is positive, the gates associated with STF which have to be considered are G16, G11, G17, G13 and G14. For the first mark element tube A of RDF is conducting and so G17 will open followed by G13, and at time $t_3$ G14 will open causing H to conduct. Thus, although a 1 or mark was read a 0 or space is stored. For the second element B of RDF will be conducting, thus opening G16, and consequently at time $t_3$ G11 will open and cause G to conduct, thus recording a 1 or mark. Also at time $t_3$, $W_{M1}$, with B conducting, G9 will open and tube F of ACF will again conduct. Thus for subsequent elements the elements will be recorded under control of G10 and G12 as for normal transfer, that is, the recording will be made as read. Hence elements E3 and E4 will be recorded as received, viz. 1, 0, respectively, and the new recording will be 0110, which is 6, as required, and also a value of 1 for element EM1 will have been added. Assuming that the metering condition is still present the next time section 1 is to be read, when P1 of counter PC is energised, once again G6 will open at time $t_1$, $t_M$, and tube C will conduct. However EM1 is now mark, so that when the metering element is read, tube A will conduct; this time G7 will not open at time $t_2$, and addition control flip-flop ACF will remain with F conducting.

With tubes C and F conducting, gate G15 will open, and at time $t_3$, G11 will open and G will be caused to conduct, thus re-storing a mark element EM1. When the digital elements are being read gates G10 and G12 will open according to the setting of RDF and flip-flop STF will be set in accordance with RDF, as in the case of normal transfer, and tube D will conduct as soon as gate G8 opens, as before. Although the metering condition may persist for several cycles of counter PC, it can be seen that 1 only is added for one metering signal.

It is assumed that the cycle time of PC is less than either the duration of a metering condition or the minimum interval between metering conditions. After the metering condition has disappeared and P1 is energised once again, G5 will remain closed and tube D will remain conducting. At time $t_M$, G18 will open followed by G13, tube M being permanently energised; at time $t_3$, G14 will open, causing H to conduct and the mark metering element, EM1, will be removed and a space stored instead. For the digital elements, tube F will be conducting and the elements will be transferred as received to the storage head as already described. A similar procedure takes place for further metering conditions.

3. Reading off with no metering condition present

When it is required to read off the metering registrations, the start key, STK (Fig. 6) is thrown. Previous to this, flip-flops F5—F10 will be set with F5I, F6L, F7M, F8Q, F9S and F10U conducting and position counter PCC with stage S1, corresponding to subscriber 1, conducting. The position counter PCC is stepped by pulses TPC from a recording teleprinter, which pulses also act as a control on gates G29 and G32. The operation of key STK applies a positive potential via normally closed contacts S2 of relay SZ to flip-flop F8 causing tube P to conduct. Tube P conducting opens gate G30 which is responsive to a single control and causes tube R of flip-flop F9 to conduct.

When the reading device is dealing with the last element of section 100, at time P100, E14, $t_2$, gate G19 opens and the counter PC, Fig. 1, steps to position P1 in readiness for again dealing with section 1, thus causing G26, Fig. 6, to open as soon as counter PCC steps to position S1 when the next pulse TPC arrives. At time $t_3$, E14 with G26 open, and tube R conducting, gate G27 will open and cause F7N to conduct and F7M to be extinguished. This closes G1 and G2, Fig. 5, preventing the stored information passing to flip-flop RDF but opens gates G3 and G4 routing the information from the reading head to the guard circuit, Fig. 6.

For this case it has been assumed that subscriber 1 is not being metered at this time which means that EM1 will not have a mark element. Thus at time $t_1$, $t_M$, G21 will open, causing F5J to conduct. At time $t_2$, $t_M$, G23 will open causing F6K to conduct. F6K sends a start signal to a binary-decimal converter, to be described hereafter with reference to Fig. 8, and at the same time prepares gate G25. This gate will then open and close in accordance with the signals received on the "1" or mark lead from the reading device and will pass the first item to the converter to record the information for section 1.

At $t_2$, E14 for section 1, counter PC, Fig. 5, steps to P2, thus closing gate G26 and consequently closing gate G27. At $t_3$, E14, G24 opens, causing F6L to conduct and F6K to be extinguished, thus preventing further information passing to the binary-decimal converter; F6L conducting also sends a stop signal to this unit. Also F6L opens G22 causing F7M to conduct, thereby opening G1 and G2 and allowing stored information to pass through RDF, Fig. 5, until the converter has dealt with the previous information. At the same time F6L causes F9S to conduct ensuring that G27 is closed until the next section has to be read off.

Whilst reading off is taking place, at each time $t_3$, G14, Fig. 5, will be opened due to the fact that F7N is conducting, and consequently the stored information for the particular section will be erased and replaced by the all "0" or space condition.

When conversion of the recording for section 1 has taken place and this result together with the corresponding subscriber's number has been printed, a signal, TPC, is received from the teleprinter control unit. This signal steps counter PCC to the next position S2, and also, in conjunction with F8P conducting, opens G29 together with G30 causing F9R to conduct once again.

Counter PC meanwhile has been counting in synchronism with the "memory" sections and eventually P2 will be energised. P2, S2 will open a gate, not shown, similar to G26 and this, together with R, will open G27 at time $t_3$, E14 of section 1 and F7N will again conduct. The information stored in section 2 will now pass to the converter and the same procedure as described for section 1 will take place.

4. Reading off with a metering condition present

Consider the case when section 1 has been read off and dealt with by the converter and that when it is desired to read off section 2 metering is taking place for this particular subscriber.

As described above, F7N will conduct due to coincidence of P2, S2; close G1, G2; and open G3 and G4, routing information to the guard circuit. Since metering is taking place, at time $t_1$, $t_M$ there will be a mark element present in EM2 and a signal will appear on the "1" or M lead. Thus G20 and not G21 will open and F5I will conduct. Since F5J is extinguished, G23 and G25 will remain closed. When F5I conducts, G22 opens and F7 returns to the condition with F7M conducting. This closes G3 and G4 and opens G1 and G2, so that the recording passes to the addition unit and is re-stored without change. Successive trials are made with following coincidences of P2 and S2 until the time when the mark element in EM2 has been removed, showing that metering has finished, after which the recording can pass to the binary-decimal converter, as described for subscriber 1.

5. Reading off for subscriber 100

Assume that subscriber 100 is allocated the last section of a drum track. When the reading operation has taken place for section 99, F9R will conduct, as previously described. When coincidence occurs between P100 and S100, gate G28 opens, and consequently at time $t_3$, E14 of section 99, G27 will open, thus causing F7N to conduct. If no metering is taking place for subscriber 100, the reading will pass to the converter. When all elements have been passed, G24 opens at time $t_3$, E14, causing F6L to conduct, thus passing a stop signal to the converter and causing F7M and F9S to conduct, as before. In the converter, Fig. 8, section or tube STB of flip-flop F14 is conducting and there will be coincidence in Fig. 6 between the controls STB and S100 thereby opening G31 and causing F8Q to conduct, extinguishing F8P. When the recording has been made for subscriber 100, the signal TPC returned from the teleprinter control steps PCC back to its original position with S1 conducting, but since F8P is no longer conducting, G29 does not open and F9 remains with F9S conducting. Instead G32 opens causing F10T to conduct, thus operating the stop relay SZ. SZ removes the positive potential from F8, so that no further reading operations can take place without further operation of STK. When STK is released, a positive potential is applied to F10U causing F10U to conduct and F10T to be extinguished. This releases relay SZ and the control circuit, Fig. 6, is now back to normal and in readiness when further readings have to be taken.

For the purpose of converting the binary numbers read off into decimal form, the binary-decimal converter described in U. S. patent application, Serial No. 197,206, filed November 24, 1950, could be used but the reading off speed used in the present device is somewhat slower than was envisaged in the said application and so it is possible to use the simpler arrangement to be described with reference to Fig. 8.

One flip-flop is provided for each element of a section, but four only, F15–F18, have been shown in Fig. 8. Initially these flip-flops are set so that F15S1, F16S2, F17S4 and F18S8 are conducting. The other flip-flops are set with F12SZ, F13SZA and F14SZB conducting. The counters PCU, PCT, PCH and PCTH are all in the 0 positions.

When it is desired to read off a number F6K in the guard circuit, Fig. 6, is caused to conduct, as described previously. This applies potential to the start lead and causes, Fig. 8, to conduct, the latter likewise causing F13STA to conduct. G41 remains closed under these conditions.

Only "1" or mark digits of a number are sent from the guard circuit to the converter via lead CML. The gates G33, 34; G35, 36; G37, 38; G39, 40; associated with the successive flip-flops F15, F16 . . ., are controlled respectively by successive time pulses E1, E2 . . . Fig. 7, so that mark pulses on lead CML from Fig. 6 are routed to the correct flip-flop even if signals are absent in certain of the time positions. If the first digit is a "1" G33 will open, causing F15M1 to conduct but if the element is a "0" there will be no signal on CML, G33 will remain closed, and F15S1 will be left conducting. For the second, third and fourth digits read off, gates G35, G37 and G39 will open or remain closed, according as mark signals are or are not received in time positions E2, E3 and E4. Likewise for the remaining digits stored in the section being read the associated gates will be opened when required and in turn until all the binary digits have been read off, the flip-flops will then have been set up to denote the binary number which was stored in the section.

When the last digit has been read off, F6L, Fig. 6, will conduct and apply potential to the Stop lead, as previously described, thus causing F12SZ to conduct and this tube, with F13STA still conducting opens gate G41, causing F14STB to conduct. This starts a local converter pulse generator, the frequency of which is in no way connected with other pulses used in the circuit and is of a value compatible with the practical operation speeds of the flip-flops F15–F18 and counters PCU, PCT, PCH and PCTH.

To illustrate the conversion of a binary number into the equivalent decimal number, take the case when the reversed binary number read off is 0101, i. e. 5. After reading off, flip-flop F15–F18 will be set up with F15M1, F16S2, F17M4 and F18S8 conducting. The first CVP pulse received from the converter pulse generator will open G42 causing F15S1 to conduct. Also one pulse will pass via G50 causing PCU to move from U0 to U1. The condition of the flip-flops is now F15S1, F16S2, F17M4, F18S8, representing the binary number 0100, i. e. 4. Thus, while 1 has been added to the count in PCU, 1 has been subtracted from the number set up on the flip-flops. The next CVP pulse will open G43 and in turn G45 and G46 and will operate F17S4. The same CVP pulse steps PCU to U2. The opening of gates G43, G45 also causes the opening of gates G34, G36 and sections M1, M2 of F15, F16 are made conducting in place of S1, S2, so that the condition of the flip-flops is now F15M1, F16M2, F17S4, F18S8, representing the binary number 0011 i. e. 3. Thus, once again 1 has been added to the count in PCU and 1 has been subtracted from the number set up on the flip-flops. The third CVP pulse opens G42 only and the state will change to F15S1, F16M2, F17S4 and F18S8, representing the binary number 0010 i. e. 2; PCU also steps to U3. The fourth CVP pulse is received, G43 and G44 open and the position is changed to F15M1, F16S2, F17S4 and F18S8, representing the number 1, and PCU steps to U4. The fifth pulse opens G42 only and all flip-flops will thereafter be in the S position representing the number 0, and the counter PCU will have moved to U5. When F15–F18 are all back to their initial condition G54 will open, causing F13SZA to conduct which in its turn causes F14SZB to conduct, thus stopping the pulse generator and preventing further CVP pulses passing to the converter from the pulse generator. It will be noted that the counter PCU is now recording the decimal number equivalent to the binary number which was read off. Furthermore, at this time the counter PCC in the control circuit, Fig. 6, will still be at the position denoting the number of the subscriber to which this record corresponds. Thus, the necessary information is available to make a teleprinter (or any other suitable) record. When F14SZB conducts again gate G55, prepared as required, will open and send a signal to the teleprinter control circuit causing the record to be made. When the record has been made, the teleprinter control circuit sends a signal, TPC, to the control circuit, Fig. 6 and the operation will proceed, as described above with the record of another subscriber. The teleprinter control circuit can also cause the counters PCU, PCT, PCH, PCTH, . ., to return to the home position.

In the above it was assumed that the number recorded was the binary equivalent of the single digit decimal number 5. However with the four ten position counters shown, PCU, PCT, PCH and PCTH, it is possible to record any decimal number up to 9999 since the counters are interconnected in such a manner that in response to the 10th, 20th, etc. CVP pulses gate G51 will open and cause PCT to step, whilst in response to the 100th, 200th, etc. pulses gate G52 will open and cause PCH to step, and in response to the 1000th, 2000th, etc. pulses gate G53 will open and cause PCTH to step.

As described, the reading off arrangement starts at subscriber 1 and continues through the sequence to subscriber 100. By a simple arrangement it would be possible to read any desired subscriber's recording without the necessity of reading through the others. This would be accomplished by presetting PCC to the desired subscriber's position, say, by a simple key arrangement; then, by operating the start key STK, the necessary information could be read off. The operation could be stopped by releasing the STK key, or otherwise the control circuit could be restored to normal by a simple switching device after taking the required reading.

In the above arrangement, when reading off, information passed to the converter unit is wiped out on the original store. Again it requires only a simple modification to allow reading off to take place without wiping out the original record. This could be accomplished by omitting the control N on gate G14, Fig. 5.

A further modification would be to have the switching gates on the output of STF instead of the inputs of RDF, in which case the guard circuit could be eliminated, for there would no longer be the necessity to prevent reading off whilst metering was taking place, but this would involve other modifications to the gating circuits to prevent the elimination of the EM element during this period. The arrangement used saves this necessity and leads to simpled gating arrangements.

As described, the reading-off device has been made common to one "memory" unit only and thereby capable of dealing with 100 subscribers only. By the use, for instance, of uniselectors arranged in normal telephone type circuits, it is possible to make the reading unit common to a number of "memory" units, in fact, one only would be necessary for a complete exchange installation.

Figs. 9 and 10 together constitute means for transforming each decimal digit into a five-unit teleprinter code.

The coder is a rectifier network, shown particularly in Fig. 9, used to translate a numerical result, as recorded in the decimal portion of the binary to decimal converter, to the particular code used for recording on the tape of a magnetic storage unit. The register, Fig. 10, is used to store this numerical result when it is so coded.

Coders and registers are provided on a basis of one for each digit or character which has to be passed from the converter to the teleprinter.

The code assumed in Fig. 9 is the International Telegraph Alphabet No. 2 which is as follows:

| Character: | Code |
|---|---|
| 1 | MMMSM |
| 2 | MMSSM |
| 3 | MSSSS |
| 4 | SMSMS |
| 5 | SSSSM |
| 6 | MSMSM |
| 7 | MMMSS |
| 8 | SMMSS |
| 9 | SSSMM |
| 0 | SMMSM |

Figs. 9 and 10 show a circuit dealing with one digit of a result, five flip-flop tube pairs CRA . . . CRE being used for registering the five variable elements as M or S.

It should be emphasised here that similar circuits are provided for every digit in a result, transfer of all digits from the binary-to-decimal converter to the coder and register being simultaneous. Each of the input leads 1 to 0 on the left-hand side of Fig. 9 is connected to the appropriate cathode of the corresponding decimal denominational tube of the binary-to-decimal converter Fig. 8. Consider that the particular digit recorded by the PCU, Fig. 8, is 1. A positive potential is then applied via the first of ten leads which extend from the ten sections U0–U9 of PCU, Fig. 8, to ten terminals 0–9, Fig. 9, to terminal 1, so as to bias rectifier W318 positive but rectifiers W319–317 remain connected to earth through the PCU sections. When the conversion is to occur, the transfer control lead acquires a positive potential and rectifier W328 is also given a positive bias. The next 5 kc. positive pulse applies a positive pulse to rectifier W329, and this in conjunction with the positive bias on W328 causes a positive pulse to be applied to rectifiers W330–9. Since W318 is the only rectifier in the leads to the aggregator which has a positive bias, a positive pulse is applied to the decoupling rectifiers W340–4, but no pulse is applied to any of the rectifiers W345–389. It will be seen that W340–4 are connected respectively to the triggers of tubes CRA–M, CRB–M, CRC–M, CRD–S and CRE–M. In consequence, these tubes strike, extinguishing the other tubes in the flip-flop pairs if any of these tubes had been previously conducting. The tubes struck denote MMMSM which is the telegraph code denoting the digit 1. The setting of the flip-flops is accomplished in a similar way for digits 2–9 and 0, the connections being such as to produce the codes shown in the above table.

The teleprinter code transmitter is the unit used to supply potentials in accordance with the information it is desired to record on a teleprinter. It is controlled by the registers, Fig. 10, and a time scale generator to cause telegraph signals to be passed to a teleprinter. The registers themselves provide the characters which are to be recorded, the time scale generator produces the unit-periods for the code signals and other time intervals necessary, and the composition distributer passes the characters forward in their correct sequence.

Each character consists of a start element, five code elements, and two stop elements and the transmitter is designed as a cascade arrangement. This obviates the necessity of having too large a number of controlling sources for any one tube. For example, if there is a possibility of having 12 characters in a result to be printed, the number of variable code elements would be 5×12=60, involving 60 controlling sources for a flip-flop tube pair used for the transmitter. By suitably dividing these sources it is possible to arrange that there would be, say, four flip-flop tube pairs each controlled from 15 sources, and these pairs could be examined consecutively to control a further stage. To further reduce the controlling networks, it is arranged that the elements are examined for a "space" condition only and an automatic return of the flip-flop pairs to the "mark" condition is used.

Fig. 11 shows the controlling rectifier network used for the flip-flop pair TR1–M/TR1–S associated with the first three characters of a result. There are other tube pairs, TR2–M/TR2–S, TR3–M/TR3–S . . . (not shown) and suitable networks for other groups of three characters. As the start and stop elements are invariable these are inserted at the final stage of the transmitter, Fig. 12.

The circuits of Figs. 11 and 12 are controlled by pulses from the time scale generator circuit TSG, shown in Fig. 11. The basic pulse frequency is 5 kc./s. The pulses supplied to lead L are 5 millisecond pulses at 50 cycles per second. Pulses supplied to lead P are also of 5 milliseconds duration but occur at 6.25 cycles per second. The other pulses have a duration of 20 milliseconds and a repetition rate of 6.25 cycles, but occur at successive time positions. These pulses are represented in Fig. 12A.

Initially the reset potential fires TR1–M. The control circuits for TR1–S consist of fifteen coincidence gates, one per permutable element of the three characters served by TR1–M, TR1–S. Only five of these are shown. Each is controlled from one of the space tubes of the register for the digit concerned and by a pulse from another control connection, these other connections going to points marked A to E. These points are sequentially energised from time scale pulse generator TSG at the speed at which the teleprinter operates, e. g. 50 bauds, so that the gates are each allowed to influence the tube TR1–S in turn. The group of five gates for the register and character in question is fed by 5 kc. pulses but a pulse can only get to the set of five gates if its connection marked X is also energised. The connections X go to a distributer which energises these connections in turn, so that only one character at a time can be effective.

Assume that X is biased positive for the character to be transmitted. Then each time one of the leads A to E is biased positive by a time scale generator circuit, this occurring for a short period once in each time scale cycle, a 5 kc. pulse is gated through to TR1–S if the permutable element circuit is a space.

Just before each of leads A to E is energised by the time scale generator, the time scale generator energises lead K, which refires TR1–M, if TR1–S was fired. Then if the next code element is a mark, TR1–S gives no output. Hence for each space element of its characters, TR1–S delivers a cathode output from the gate connected to its cathode to the portion of the circuit, Fig. 12, which inserts start and stop elements.

Connections are taken from the cathodes of the space tubes, TR1–S, TR2–S, TR3–S etc., to a rectifier network used to control the flip-flop tube pair, TM—TS, Fig. 12. Also in this stage is the connection by means of which the space element indicating the start unit-period is inserted.

When TR1–M, TR2–M, etc., are initially struck, tubes TM and TXM also are fired by potentials applied to their cathodes over the respective reset leads. Before the first code element is examined by TR1–M/TR1–S the rectifier W527 (Fig. 12) is biased positively by the pulse applied to the L lead from the time scale generator TSG part way through each element. For the start element, the time scale generator TSG puts a positive bias on lead Q at the same time that W527 is biased positive. A 5 kc. positive pulse is then applied via rectifier W537 to the trigger electrode of tube TS. At this time the connections from TR1–S, TR2–S etc., are at earth potential, as the respective flip-flop pairs are all in the mark condition. Tube TS strikes, extinguishing TM, thus giving a positive bias to rectifier W544; W543 is connected to earth. The same positive 5 kc./sec. pulse steps the time scale generator to produce a potential on lead P, so that rectifiers W546 and W548 are given a positive bias. The next 5 kc. pulse, which steps the time scale on from the position in which it biases lead P, also gives a positive bias to rectifiers W545 and 547 for the duration of the pulse and, because of the potential already applied to W544, TXS strikes, extinguishing TXM. The output potentials taken from the cathodes of tubes TXM and TXS are used to control the teleprinter (see below).

The tube pair TM/TS is restored to its normal condition with TM conducting by means of the biases applied to rectifiers W542 and 541 but tube TXS remains conducting. The bias on lead L is supplied by the time scale generator TSG at the beginning of each code element. The next time that the time scale generator steps to provide a potential to W527, the time scale has stepped to the position for the next element so that the connection to TS via rectifier W537 loses control. However, the time scale puts a positive potential on lead A, and a connection from TR1–S via rectifier W538 becomes positive if the first code element of the first character is a space and it remains at the positive potential for the time the time scale generator is biasing leads P and Q. Connections from TR2S, TR3S . . . (not shown) are still connected to earth. It was assumed that the first code element was a space so that when rectifier W527 became blocked, W533 was also positively biased and W534 was biased positive by A to tube TS is therefore struck by a triggering pulse applied via rectifier W539. The conditions (biased positive or not) of W544 and 545 are again examined before the tube pair TM/TS is restored, and since rectifier W544 has a positive bias due to TS conducting, tube TXS remains struck. Had the first variable element been a mark, W543 and not W544 would have had a positive bias, so that TXM would then have been struck, extinguishing TXS, and causing a mark indication to be emitted.

TM is again restruck when the time scale generator TSG gives a potential on lead L (see above). In like manner the other code elements denoted by the presence or absence of positive potentials on the connection from TR1-S are examined. For each element there is a gate like those shown, each such gate having a control lead to TR1-S and a control lead to the time scale generator TSG. It should be noted that TXM/TXS is not automatically restored, as is the case with the other flip-flop pairs, but changes over only when there is a change of polarity detected in the examined elements. After the code elements of the first character have been examined, TM restores to its conducting state and this flip-flop pair remains in this state until the time scale generator TSG returns to the condition in which potentials are produced on leads Q and the lead bias to apply to W527 enabling another start element to be inserted before the next character to be recorded. The time interval between the end of the fifth code element and the next start element is equal to two unit-periods and provides the two recorded mark elements used for the stop portion of the character combination. That is, the mark elements are produced by the fact that there is no space element.

The potentials on TR2S, TR3S . . . (not shown) are examined in similar manner and the signals denoting the code elements of the different characters are passed in correct sequence to the recording medium.

The output leads from TXM—TXS are marked M and S respectively. These pass to a telegraph device of well-known type to produce a teleprinter signal on a single wire for use by the teleprinter.

The invention has so far been described in terms of a magnetic drum as the means of storing information. An external circuit was used to read information from the drum and to return the information in either its original or modified form. It is possible to use means other than the drum to store the information, still using a similar form of external circuit. Two such systems are outlined below, one using a mercury delay line and the other a cathode ray tube of a particular type as the storage means.

Mercury delay line storage is shown in Fig. 13, the reading, condition, addition control, and record flip-flops are as described above. The pulse supplies previously obtained from tracks on the magnetic drum now have to be provided, for instance, by using an oscillator and pulse shaper to provide basic clock pulses and using well known methods to derive the other required pulses from the clock pulses. Mercury delay line storage has become known in connection with electronic computers, and an example is shown and described in the British journal "Electronic Engineering" for July 1948 in an article "An ultrasonic memory unit for the 'EDSAC'" on pages 208 . . . 213, by Wilkes and Renwick. The present schematic circuits are based on Fig. 3 of the said article.

Consider that a series of numbers to be recorded, and modified, if necessary, are circulating in binary form through the mercury delay line and external circuits. Further, assume that the first element in the series is present and has just arrived at the right hand end of the delay line. The pulse, which is ultrasonic, is amplified by the ultrasonic amplifier, ULA, assumed to be 13.5 mc./sec. and is then rectified in RCT to remove the ultrasonic carrier, leaving the video pulse. This pulse passes to the video pulse amplifier and pulse shaper VAS. This circuit is arranged to give two outputs, one of which, say M, will be a positive pulse and the other, say S, earth when an element is present and vice versa when an element is absent. In the case considered, i. e. an element present, the M lead will have a positive pulse and the S lead will be at earth. The two outputs pass to two gates where they are gated by clock pulses to restore their shape which will have become distorted by passage through the mercury delay line. The gate outputs are used to set the reading flip-flop, which, for the example considered, will be set to the mark side. The remaining flip-flops operate as described above. The record flip-flop output is used to modulate the 13.5 mc./sec. oscillator and the element passes back as required into the mercury delay line.

Since the circuit used for modifying the stored information produces delay, the length of the mercury delay line is such that the sum of the delays in the mercury and in the external circuit is equal to the required circulation time for the number of elements which it is desired to store.

Cathode ray tube storage is illustrated in Fig. 14, and is based on the dot-dash display described in "A storage system for use with binary-digital computing machines" by Williams and Kilburn published in the Journal of the I. E. E., part III, March 1949. The tube is the so-called "Williams" tube which has also been used in electronic computers in the U. S. A. A signal or pick-up plate PU consisting of a sheet of metal foil or gauze, external to the end of the cathode ray tube, is closely attached to the face of the tube. Each area of the screen is therefore capacitance coupled into a common channel, as in the ionoscope. The digits are represented by charge distributions which exist in small areas in two-dimensional array on the screen.

The areas are subjected sequentially line by line to electron bombardment, and video signals are obtained from the pick-up plate PU. Again the reading, condition, addition control and record flip-flops are as described above. The strobe pulses and dot and dash waveforms are obtained as described in the above mentioned article. The other required pulses are derived by well-known methods from the strobe pulses. The X time-base circuit for the cathode ray tube is similar to that described for the dot-dash system but the Y time-base circuit is similar to a television type time-base in which the beam is caused to move progressively down the face of the tube.

It is assumed that a series of numbers has been recorded on the cathode ray tube and that the first element, a dash, is just being scanned by the beam. The positive output is amplified and passes to a gate STG1 where it is gated by the strobe pulse, giving a positive output from the gate. If the element had been a dot the output from the amplifier would have been negative in which case there would be no output from the gate. The output from the gate passes to an inverter IVR and also in parallel to a dash cathode follower DSF. The inverter output passes to another gate STG2 where it is gated by a strobe pulse and the gate output passes to a dot cathode follower DTF. This arrangement is used so that when a dash element is scanned by the beam, the dash cathode follower DSF gives a positive output and the dot cathode follower DTF no output and vice versa if the element scanned by the beam is a dot. By this method the reading flip-flop is set in accordance with the element being scanned. The remaining flip-flops operate as described above. The two outputs are taken to gates where one, DSG, is gated with a dash waveform and, the other, DTG, with a dot waveform. In the case when it is desired to re-store a dash, there will be a dash waveform from the dash gate and no output from the other gate, and when it is desired to re-store a dot, there will be a dot waveform from the dot gate and no output from the other gate. The outputs from the gate, which will be negative going, are inverted in IVS and passed via a cathode follower CTF to the grid of the cathode ray tube CRT to modulate the beam of that tube.

The time for which the beam remains on a position on the face of the tube is fixed to take care of the delay in the external circuits.

The remaining drawings show another form of equipment for registering on magnetic drums the number of calls made by telephone subscribers and also a method of extracting the information, thus stored, and converting it into a suitable form for permanent recording, for instance, by printing.

The equipment can register unit fee calls or multi-fee calls when it is not required to give a separate record of the number of calls of different fees. After a suitable period of time, the number of calls recorded can be read off and printed, together with the appropriate subscriber's number, on a Printer. The operation of the system will be described up to the point where both the subscriber's number and the number of calls made by this subscriber are in a form suitable for application to any desired form of recording device.

The magnetic drum, Fig. 15, consists of a nickel-plated brass cylinder of sufficient length to provide a number of non-interfering parallel magnetic registering tracks TR1 ... 10 round its periphery. Each track has a read head RDH and a store head STH, the two heads being connected by means of electronic circuits. Each track can be divided into a number of elements, each of a length adequate for recording a longitudinal N-S or S-N magnetic record. For the purpose of this description it will be assumed that one drum is allotted to 1000 subscribers and that the drum consists of 10 tracks, each track, therefore, being common to 100 subscribers. As two separate heads are used per track, it is necessary to utilise two sections of the track per subscriber, i. e. each track is divided into 200 sections, each section consisting of sufficient elements to store the maximum number of subscriber calls on a binary basis. If it is assumed that 14 elements are used per section, the maximum number of calls that can be registered in binary notation will be approximately 16,000. As will be seen later, two additional elements are required per section, making 16 in all. Round the periphery of each track it will be necessary to have $200 \times 16 = 3,200$ elements. It is possible to register 100 elements per inch, this means a drum about 32 inches in circumference having a diameter about 10 inches.

The rotational speed of the drum must be such that the time taken for half a revolution is less than the minimum time of the metering pulse, say 100 m. secs. Therefore, the minimum speed of the drum would be 300 R. P. M.

In order to produce pulses which are locked to the rotation of the drum, an additional track TRP is provided which has teeth cut on its periphery. There is one tooth per element: i. e. 3200 teeth. After cutting, these teeth are magnetised. As the drum rotates, these magnetised teeth produce pulses in an associated pulse head PH. A synchronising track TRS is also provided which has one magnetised tooth, similar in size to a pulse tooth, and a synchronising head SH.

If necessary, more tracks can be added to the drum to increase its capacity.

The electronic equipment for a drum comprises a number of sets of circuits, each individual to one drum track, and a set of circuits common to the drum. Referring to Fig. 15, the equipment per track consists of an amplifier AMP1 ... 10, connected respectively to each read head RDH1 ... RDH10, a track control circuit TCC connected to the amplifier, a mixing circuit MXC, and an addition circuit ADC. For metering purposes the drum is continuously rotating and the heads are continuously reading and re-storing. At any moment the heads of a track are reading one section allocated to a particular subscriber and registering on his other section. Assuming no addition is taking place, as the drum rotates, pulses corresponding to the stored information are produced in the Read Head and passed via the track control circuit TCC and Addition circuit ADC to the storage amplifier and head STH1 ... 10. Therefore a magnetic pattern is impressed on the section of track passing under the storage head. This pattern consists of longitudinal N-S or S-N magnets head to tail without any gaps and therefore is overprinted on the existing pattern on the section. This pattern is the same as that passing under the read head. In this way, the information is passed form one section of the drum to a section which is, for example, diametrically opposite to the first.

When a metering pulse is received, a condition is applied by the mixing circuit MXC to the addition circuit ADC at the instant that the section of track corresponding to the line being metered passes the read RDH1 ... 10 head. The addition circuit causes 1 to be added to the binary number being transferred from the read to the record head, that is to say the number of calls registered has been increased by 1.

Figure 16:
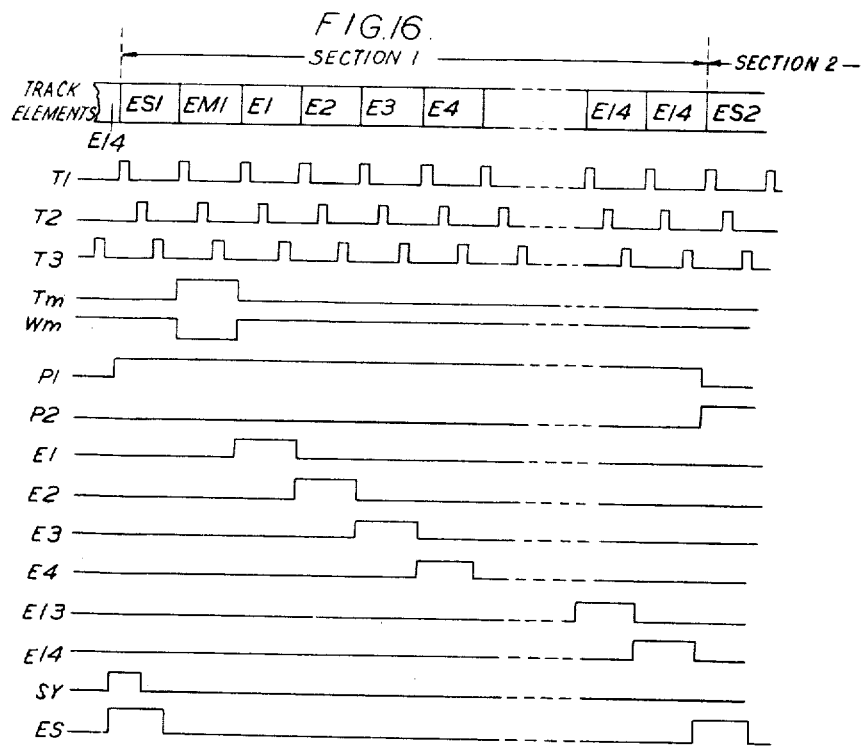
Fig. 16 shows pulse time cycles derived from the magnetic drum of Fig. 15.

The output from the pulse head PH is fed over amplifier AMPP into the various drum pulses PU circuit DPC which is common to the drum and produces the pulses required for the associated circuits. These pulses are shown in Fig. 16. Pulses T1 are produced directly from the Pulse head, whilst pulses T2 and T3 are derived by means of delay circuits from T1 in a manner similar to that described in connection with Fig. 1. The other pulses are produced from T1 by means of Counting Chains and Flip-Flops.

A more detailed description of the system follows.

Fig. 16 shows portions of two sections of the track with their associated pulse supplies. Each section, corresponding to one subscriber's line, consists of 16 elements. Each digital element represents a power of 2, e. g., $E1 = 2^0$; $E2 = 2^1$; $E3 = 2^2$; $E4 = 2^3$ etc. Two elements ES and EM are also included at the beginning of each section; their function will be described later. T1 appears at the beginning of each element, followed by T2 and T3. $Tm$ is applied for the duration of each element EM. $Wm$ is the inverse of $Tm$. P1 is on for the duration of section 1 while P2 is on for the duration of section 2. Therefore, there is a discrete pulse as each section passes a head. There is also a discrete pulse for each element E1-E14. All pulses are derived from the T1 pulses.

The pulse circuit is common to the drum and supplies the pulses required to operate all of the circuits associated with the drum.

Pulse SY is obtained from the Synchronising Track TRS, Fig. 15. Coincidence between SY and a T1 pulse indicates the start of Section 1 and thus ensures that after a stoppage, the position of each section of the drum is the same as previously. This pulse can also be used for synchronising on each revolution of the drum.

Figure 17:
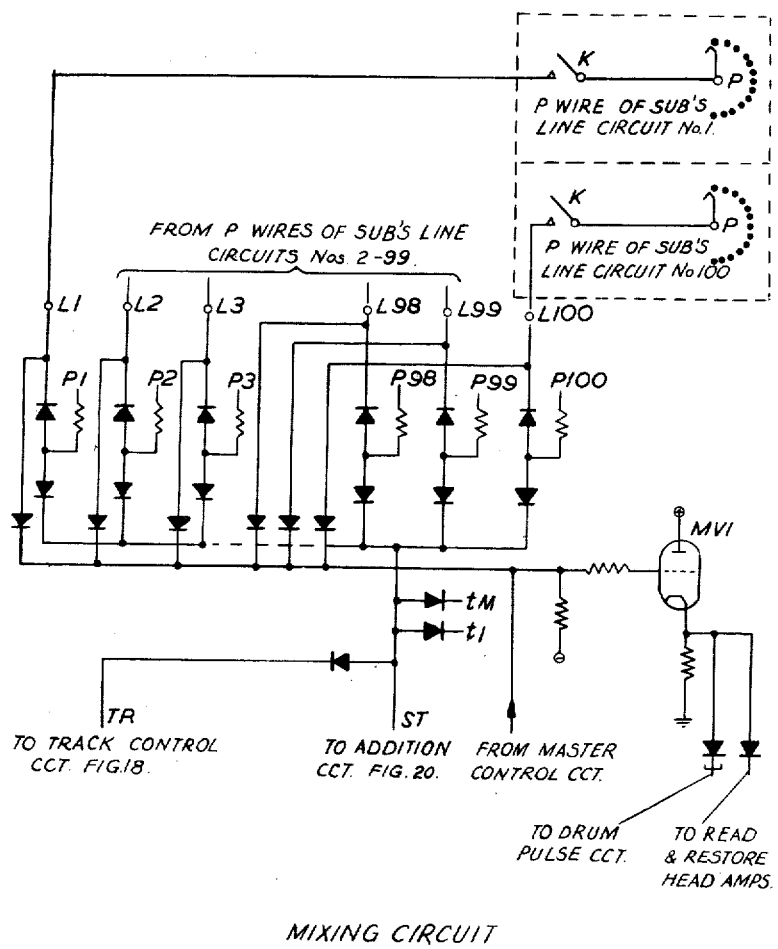
Fig. 17 shows a mixing circuit provided for each one of a large number of parallel circular magnetic tracks on the drum, each of which records the metering information for a group of substations.

The mixing circuit, Fig. 17, connects the 100 P wires of the subscribers' line circuits to the addition circuit ADC. When a metering signal appears on any line in the group, it is passed on to the addition circuit ADC (Fig. 19) when the section of track corresponding to this line is passing under the read head. This is controlled by the appropriate pulses P1–P100. Assuming that No. 2 line has a metering signal on its P wire; when pulse P2 appears and the corresponding element EM begins to pass under the read head, coincidence occurs between L2, P2, $Tm$, T1 and TR, and a pulse is applied to the Addition Circuit via the ST lead for the duration of T1. There is a positive potential on TR except when information is being read off for printing purposes as described below.

This mixing circuit ensures that an addition signal is only given to the addition circuit when the required section and element of track is passing under the read head. One mixing circuit is provided per track.

One track control circuit TCC is connected to each track. This circuit is shown in detail in Fig. 18, and its function is to switch the output from the read head amplifier, e. g. AMP1, to either the addition circuit ADC or the guard circuit GDC. When the normal transfer from read to store heads is taking place; tubes RA and RB are fired. RA opens the gates RS and RM which pass the signals from the read head amplifier to the addition circuit. RB applies a potential to the TR lead to the mixing circuit thus ensuring that the mixing circuit will only pass a metering pulse to the addition circuit when the track control circuit is in the condition allowing transfer from read to store heads.

The operation of the track control circuit when information is being extracted from the drum will be described later.

The addition circuit ADC, one per track shown in detail in Figs. 19 and 20, is essentially the same as that described above. The method of transfer without addition will be described first. Fig. 21, left hand side, is a chart showing the operation of the circuit under this condition. For this purpose only four digit elements are shown. The number stored is 5, i. e., in binary form, 0101, and the section of the track is No. 2.

A mark condition indicates digit 1, whilst a space condition indicates digit 0. ES2 always gives a space. As ES2 passes the read head the condition of the flip-flops is B, C, E, EA and H fired. EM2 is normally in the spacing condition unless an addition has been carried out and the corresponding metering signal is still on the P wire. Therefore in this example EM2 is in the space condition. As ES2 passes the read head, tube B remains fired. Pulse P2 comes on at the start of ES2 but is ineffective in the mixing circuit as there is no metering condition. T2 has no effect on the circuit. T3 in conjunction with WM, B and EA opens gate GA6 and applies a pulse to the grid of H which is already fired. Similarly, no change in the circuit takes place when element EM2 is under the read head, due to coincidence between C, T*m* and T3.

E1 is in the mark condition; therefore A fires and B is extinguished. T1 and T2 are ineffective but due to coincidence between T3, W*m*, A and E, GA2 opens out tube G fires and extinguishes H. G being fired causes a mark condition to be applied to the store head. E2 is in the space condition; therefore B fires and extinguishes A. T1 and T2 again have no effect, but with coincidence between T3, W*m*, B and EA in GA6, tube H is fired and G extinguished and a space applied to the store head. The circuit functions in the same way when elements E3 and E4 pass under the read head, i. e. a mark and a space are applied in turn to the store head. In this way the number stored on one section of the track is transferred to and overprinted on the second section of the track corresponding to the same line. At the end of the last element of a section, the appropriate P pulse is removed and the P pulse corresponding to the next section of track is applied to the Mixing Circuit.

It will be observed that when normal transfer is taking place, tube A controls tube G and tube B controls tube H. It will also be noticed that there is a delay between the operation of the AB flip-flop and the operation of the GH flip-flop. This delay necessitates the displacement of the Store Head by a distance equivalent to ⅔ of an element.

The method of adding 1 to the number already stored will now be described. The right hand part of Fig. 21 is a chart showing the operation of the circuit in this condition. As in the case described above, P2 is applied to the Mixing Circuit as ES2 passes the read head and also, as before, tubes B, C, E, EA and H are fired. It will be assumed that the number already stored is 5 i. e. a Mark condition on elements E1 and E3.

A metering condition is applied to the P wire of line No. 2 i. e. L2 in the mixing circuit (Fig. 17). As EM2 passes the read head, coincidence will occur between L2, P2, T1, T*m* and TR, Fig. 17, to apply a pulse to the lead ST to Fig. 20 in which tube D fires. D extinguishes C. Since EM2 registers Space on the track, B will be fired. Coincidence occurs between T2, B and D in gate GA9 to fire F which extinguishes E. Coincidence between F and T3 opens GA10 and fires FA which extinguishes EA. Due to the CR cathode load of FA, the cathode potential builds up slowly thus preventing E from firing. Due to coincidence between T3, T*m*, B and F, GA3 opens, and tube G fires and puts out H. A mark is therefore applied to the Store head which is a reversal of the condition applied to the read head. A mark on EM2 indicates that a metering condition is on the P wire.

E1 is in the mark condition and therefore A will fire and B extinguish. C will fire and extinguish D because of coincidence between D, W*m* and T1 in GA11. T2 is ineffective. With A fired, when T3 is applied, H fires via GA7 and applies a space to the store head. Once again a reversal of the track condition has taken place. E2 is a space and B will fire. T1 and T2 have no effect. With B and FA fired, when T3 arrives, E is fired via GA8 and in turn fires EA and extinguishes F. When EA fires, FA is extinguished. However, as a result of the circuit in the cathode circuit of FA, the cathode potential of FA, which is applied to gate GA1, is not immediately removed. Therefore, gate GA1 opens owing to an effective coincidence of control potentials from B, FA, T3 and W*m*. This has caused another reversal to take place. The change-over to E and EA prevents further reversals.

E3 is a Mark, so A fires, extinguishing B. T1 and T2 are ineffective. T3 causes a pulse to be applied to G due to coincidence between A, E, T3 and W*m* in GA2. In this case there is no reversal. For the remainder of the track section, no reversals take place, the operation of the circuit being as described for normal transfer. On the second track section elements E*m*2 and E2 have therefore changed to Mark and E1 to Space. The other elements have not been changed. This means that the digit stored is 6 i. e., 0110. It will be seen that all digit elements up to and including the first space are reversed which is the condition required when adding 1 to a binary number. The fact that EM2 shows a Mark, indicates that no further addition must occur.

After about half a revolution of the track, the section which has had its digits increased by 1, again comes under the read head. The chart for this operation is on the left hand side of Fig. 22. The meter pulse is still on the P wire; therefore, when element EM2 comes under the read head, D fires and extinguishes C. EM2 is in the Mark condition; therefore A is fired. When pulse T2 arrives, F is not fired, as B was extinguished by the operation of A. With D and E fired, pulse T3 opens GA4 and fires G which extinguishes H. Therefore a Mark is applied to the store head. The next T1 pulse causes C to fire and D is extinguished. The operation of the circuit for the remainder of this section is the same as for normal transfer from the read to the store head with no reversals taking place. This means that both sections of track corresponding to L2 have now had 1 added i. e. both now read 6 and on both sections element EM2 is a Mark condition.

When the meter pulse is removed from the P wire the operation of the circuit is as follows; see right hand side of Fig. 22. In this case, when the read head is passing EM2 there is no potential on the ST lead to fire D and C remains fired. Coincidence between C, T3 and T*m* apply a pulse to H via GA5. However, H is already fired and this is only included as a guard against false operation.

H applies a space to the store ahead. Therefore EM2 has returned to the Space condition, which indicates that another addition can take place. The remainder of the operation over this section of track is the same as for normal transfer.

Figure 18:
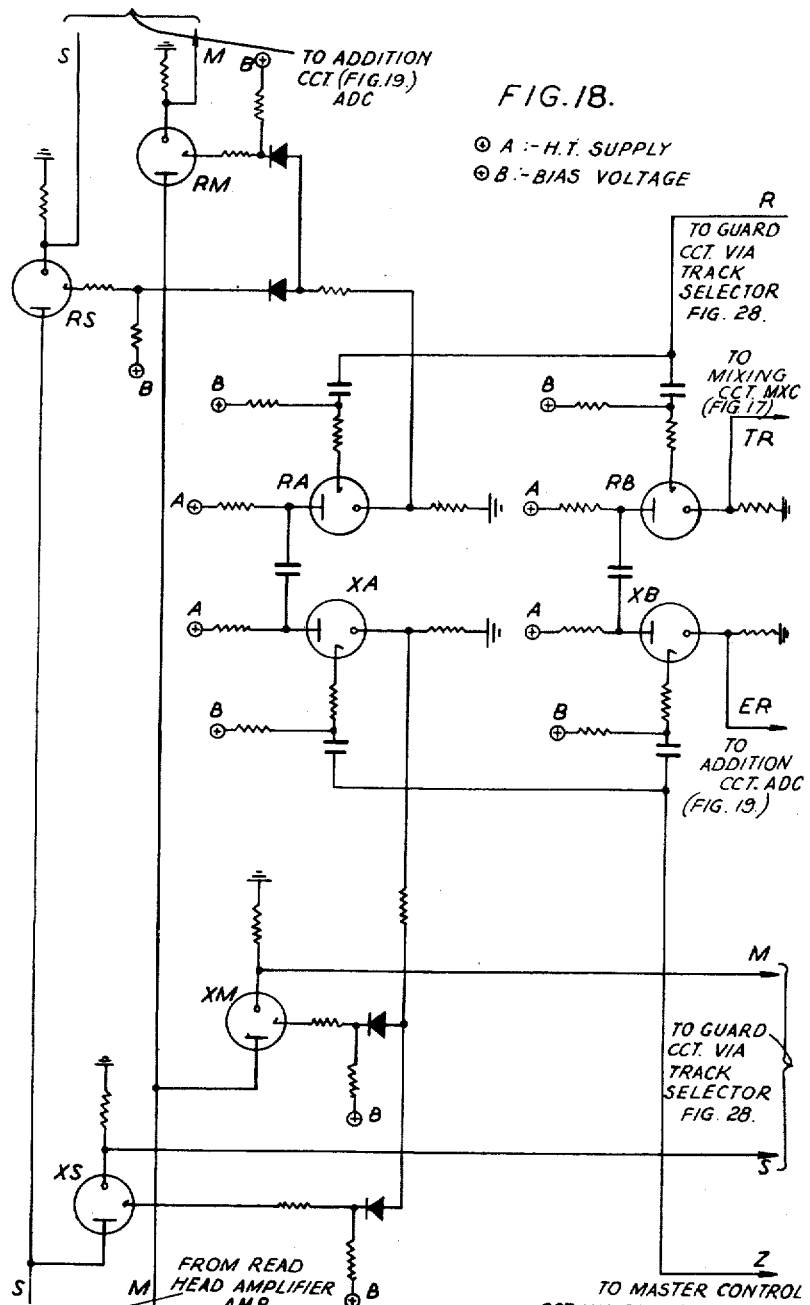
Fig. 18 shows a track control circuit one of which is provided for each magnetic track.

The lead ER from the Track Control Circuit, Fig. 18, is to ensure that H remains fired when the information is being read off to the Element Record Circuit. With H fired, a space is applied to the store head. This space is overprinted on what is already on the track and effectively erases all the information of the particular section which corresponds to that being read off.

Fig. 23 is a Trunking Diagram of the whole system. This drawing should be read in conjunction with Fig. 15 which shows the circuits connected to each track. In the Trunking Diagram the Amplifiers, Track Control, Addition and Mixing Circuits are in one "box" labelled "Track Cots."

The master control circuit, the binary-decimal converter, the printing circuit and the printer are common to all drums. The uniselector DS is a drum selector which connects the Master Control circuit to the required drum. There is one track selector, TSA, TS, J, for each drum, its function being to connect (a) the master control circuit to the required track circuits and (b) the guard circuit to the required track circuits. The guard circuit is provided to prevent information being extracted from a section of track when there is a metering signal on the P wire corresponding to this section. The equipments individual to the various drums are identical.

In order to read off the number of calls registered per subscriber, the following sequence of operations takes place which will be described in detail later on.

DS connects the master control circuit to Drum 1. When Section 1 of track 1 is passing under the read head, a signal is applied to the Track Control Circuits to switch the read head to the extract condition. The number stored on this section is transferred to the Binary-Decimal converter. After the last element of this section has passed the read head, the track control circuit is switched to the transfer condition. Also a signal is sent to the master control circuit to prevent any further start signals being applied to the track control circuit. Whilst the information is being extracted from the drum, the master control circuit has sent to the printer the number of the subscriber's line. In this example we can assume that the number of the line is 1111, being the first section of the first track of the first drum. It is also assumed that a drum consists of 10 tracks, each track storing the number of calls made by 100 subscribers.

After the printing of the subscriber's number, the number of calls made by the subscriber is printed or otherwise recorded. When the printing is complete, a signal is sent from the printer to the master control circuit, causing it to give a signal to the Track control circuit when the next section of the track is passing the read head. The number stored is read off and printed in the same manner. This sequence of operations continues until the last section of track has been dealt with. The track selector then steps to the next position and the stored information on this track is read off and printed.

When the last section of the 10th track of Drum 1 has been read off, the drum selector steps to the next position and the information on the second drum is extracted in the same manner. In this way, the information on all drums is extracted and printed along with the subscriber's numbers. When this occurs, the master control circuit gives a finish signal and restores to its rest condition. The above will now be described in more detail. Figs. 24, 25, 26, 27 and 28 shows the master control circuit.

Figure 28:
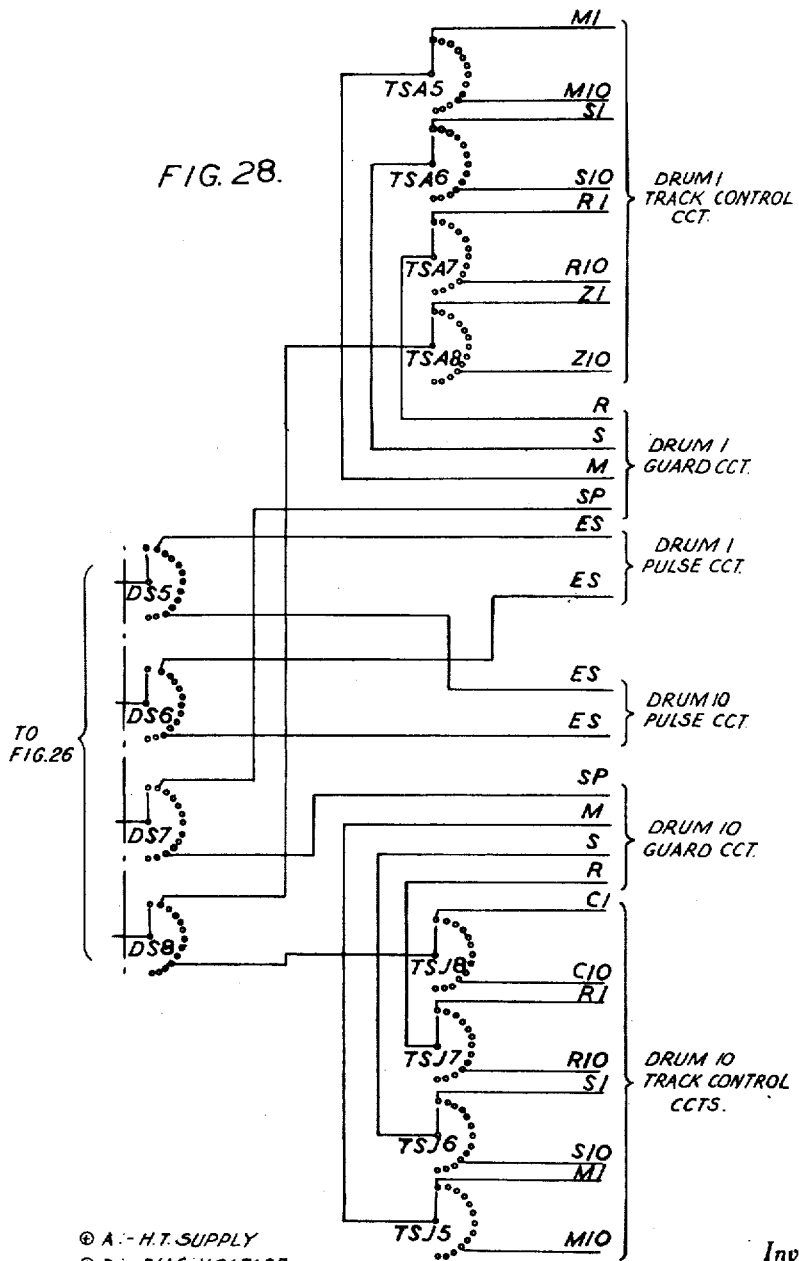

The first line to be read off will be the line corresponding to the first section of the first track of the first drum, i. e. subscriber 1111. DS, Fig. 28, is on its home position and TSA—the track selector of drum 1—on position 1. It is necessary that the master control circuit be synchronised with drum 1; therefore the pulses required for the operation of the control circuit counter train are obtained over the ES lead from the drum pulse circuit, Fig. 16. Also, in order to lock the counter to the pulse circuit, the SY pulse is used to start the counter train. In this way the pulses produced by the master control circuit counting train are in alignment with the P1, P2, etc. pulses produced by the drum pulse circuit, Fig. 16.

To start extracting the information from the drum, key STK, Fig. 24, is operated. Earth from wiper DS1 via wipers TSJ1 . . . TSA1, normal contact FN5, make contact STK, break contact $sta2$, operates relay ST. Contact $st1$ operates STA slowly; $st3$ energises the DS driving magnet via break contact of $pr5$. Make contact $st5$ (Fig. 25) connects a negative potential to the cathodes of tubes CS, P100 (Fig. 26) and S1 (Fig. 27). ST8 fires CT, Fig. 26, but not until STA is operated by make contact $st1$. Make contacts $sta1$ and $sta2$ complete a holding circuit for STA; break contact $sta2$ releases ST slowly; $sta3$ breaks the DS magnet circuit, causing DS to step to position 2; $sta4$ connects the H. T. voltage to the tubes (with the exception of CT and ET). With DS on position 2, lamp DR1, Fig. 24, glows, indicating that Drum 1 circuits are connected to the master control circuit, and TR1 also glows, indicating that Track 1 is connected. Tubes, CS, P100 and S1 fire due to the negative potential on their cathodes. When ST releases, a marking potential is applied via make contact $sta5$, break contact $st4$, break contact $pr6$ and wipers DS4, DS2 and TSA3 to leads M1 and C1 to the recording equipment. Also, as S1 is fired a potential is applied to lead 11, Fig. 27. These marking potentials inform the recording equipment that the number to be read off is 1111. The counter and the distributor have now been set with tubes P100 and S1 fired. The trigger of SC is connected to the SY lead of Drum 1 through ST7 back, Fig. 26, and wiper DS6, Fig. 28.

When the first SY pulse arrives, SC is fired and prepares a gating circuit GA24 for gating the ES pulses to the counter. The first ES pulse to arrive after SC is fired is applied to the common pulse lead of the counter. As P100 was previously fired, P1 is biassed and thus on the arrival of the first ES pulse, P1 fires and extinguishes P100. With P1, S1 and CS fired and a pulse on the ES lead, a signal is applied via gate GA24, gate GA29, and via DS8 and TSA8 to the Z1 lead. This lead is connected to the Z lead of the Track 1 control circuit, Fig. 18. This same pulse is also applied to the ST lead to the printer control circuit to give this circuit a start signal and it now causes the subscriber's number to be printed. This pulse is applied as the ES element of the section is passing under the read head, Fig. 16.

The pulse from the master control circuit is applied to the Z lead at the instant the ES element of this subscriber's section is passing under the read head. Tubes XA and XB in the track control circuit, Fig. 18, fire and extinguish tubes RA and RB, thus closing the gates RS, RM to the addition circuit, Fig. 19. The gates XS and XM are opened by XA and the pulses from the read head amplifier are passed to the binary-decimal converter via the guard circuit, Fig. 29, via leads S, M. A positive potential is applied to the ER lead by XB. This potential is fed to the Addition Circuit, Fig. 19, in order to erase the information on the section of track passing under the record head.

When the last digit has been sent via the guard circuit, a signal is applied, as described below to the R lead which fires RA and RB which extinguish XA and XB. The circuit is now in the condition to allow transfer between the read and store heads.

As stated when information on a particular section has to be read off, the output from the read head amplifier is gated via the track control circuit, Fig. 18, the track selector circuit, Fig. 28, to the guard circuit Fig. 29. If element EM of the appropriate section is a space, GS fires (if it is not already fired) via space lead S due to coincidence between Tm, T2, and the signal from the track control circuit. GS causes ST to fire when T3 arrives and ST primes MG. Each mark signal which is applied to the M lead is therefore gated through MG to the binary-decimal converter, via lead PS. ST applies a start condition to the Converter circuit.

If, on the other hand, the signal in position EM is a mark, which indicates that a metering condition is on the P wire of the subscriber whose section is being read off, it is not desirable to continue. Under this condition GM is fired instead of GS, when pulse T2 is applied. GM extinguishes GS and applies a signal to the R lead of the Track Control Circuit. This, as previously described, operates tubes RA, RB, Fig. 18, to open gate tubes RS, RM, and switches the read head output to the addition circuit. When the metering condition has been removed from the P lead and element EM restored to space, the stored information will be transferred to the binary-decimal converter when that storage section next comes under the read head.

A mark condition on the element indicates the presence of a digit. By transferring the mark condition to the converter, the number on the drum is transferred to the converter where a binary counter is set as described below. When the last element of the appropriate section has been scanned by the read head, SP fires due to coincidence between T3 and E14. ST is extinguished. At the instant SP fires, a pulse is applied via leads SP to both the master control circuit and binary-decimal converter, indicating that the last element of the track section has been read off. SP also applies a condition to the R lead of the track control circuit to cause the read head output to be switched to the addition circuit by operation of tubes RA, RB, Fig. 18, and the opening of gates RS, RM.

When the last element of the section is passing the read head, the stop pulse is applied from the SP lead of the guard circuit, Fig. 29, via DS7, Fig. 28, to fire tube ES, Fig. 26, thus extinguishing CS. With CS extinguished it is not possible to send the start pulse via the Z lead.

If a metering signal is on the P wire of the subscriber whose section is being read off when the start signal is applied, the information on the drum is not transferred to the binary-decimal converter, due to the action of the guard circuit. Therefore the stop pulse is not applied to the SP lead and when the counter has finished a complete count, another start pulse is applied to the Z lead of the track control circuit. It should be mentioned that the counter P . . . P100, Fig. 2, takes one step as each subscriber's section passes under the read head under control of the ES pulses via wiper DS5, Fig. 28.

Figure 27:
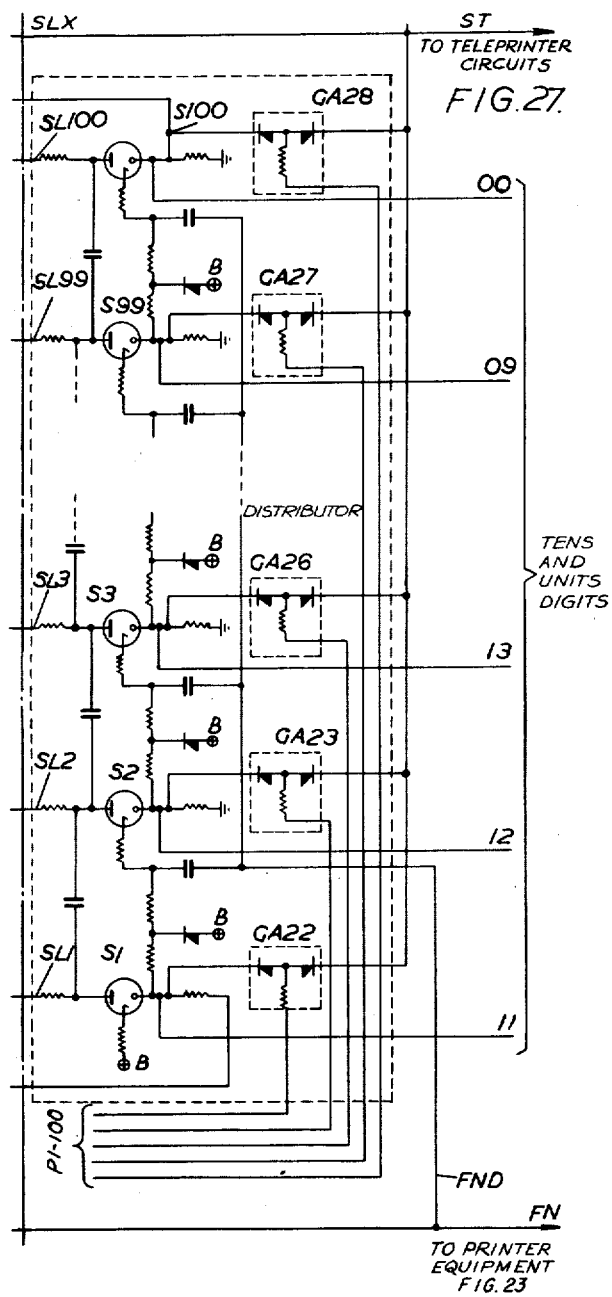

The record equipment will be arranged to give a signal over lead FN, Fig. 27, when the required information has been recorded, i. e. the subscriber's number and the number of calls. This pulse fires CS which extinguishes ES. This pulse also steps the Distributor via lead FND and S2 fires, extinguishing S1. Lead 12 to the recording equipment is now marked to indicate tens and units digits 12 and the marking potential removed from 11. The second section of track can now be read off. With coincidence between S2, P2, via GA23, and between CS and an ES pulse via DS5, at GA29, the start signal is sent via lead ST, Fig. 27; in this case when the second section of track is passing under the read head. When the information relevant to this section has been recorded the Distributor is stepped and the next section read off. The ES pulses are produced by the pulse generator to coincide with each ES element of the track. These pulses are represented in Fig. 16. Each ES pulse appears just prior to a TM pulse.

The above sequence of operations continues until the last section of track is reached. In this position S100, Fig. 27, is fired. When the stop signal is received, via lead SP, Fig. 28, wiper DS7, ES fires as before. Also, due to coincidence between S100 and the stop pulse, on GA25, Fig. 26, ET fires and CT is extinguished. When the end of record signal is received, via FN, FND, tube PT fires and relay PR operates. The Distributor does not step, as there is no coupling between S100 and S1; neither does CS fire as CT was extinguished, and therefore gate GA21 cannot open.

Contact pr1 prepares a holding circuit for PR. Earth, via break contact st2, make contact pr2, wiper DS3, energises magnet TSA of switch TSA1 . . . 8. Contacts pr4 open and release STA. Contacts pr6 open and remove the marking potential via wipers DS4, TSJ3 from the Thousands and Hundreds Digit leads to the recorder. When STA has released and opened contacts sta4, Fig. 25, all of the fired tubes with the exception of ET are extinguished. With STA released, ST is re-operated over break contact sta1 and in return re-operates STA via make contact st1. Break contacts st2 open and cause TSA to step to position 2. Make contact st5 pre-sets the counter and distributor. On the operation of STA, PR is released by the opening of break contact sta6. ST is also released since contacts sta1 and 2 are both open, and the circuit is ready to extract the one hundred subscriber meter readings stored on the second track which is now read off as previously described. The rest of the tracks on Drum 1 are read off in turn in the same manner.

As TSA steps, the hundreds digit marking potential is applied to the appropriate lead via TSA3. Also the appropriate lamp indication is given. When the last section of the nth track is reached, PR is operated as before. With PR and ST operated, and STA unoperated DS steps to position 3, via tsa4 and DS9, to earth on its nth contact. The earth on bank 4 of any of the track selectors TSA is connected to a contact n depending upon the number of tracks in use. The master control circuit is now connected to drum 2. Lamp DR2 (not shown) now glows with lamps TR1, indicating track 1 of Drum 2. The marking potential is on leads M2 and C1, indicating a group of numbers 21.

The operation of the circuit is the same as previously described until the last section of Drum 10 is reached, i. e. all the information on all drums has been read off. It is assumed that there are ten drums in the exchange, the number of drums depending upon the capacity of the exchange.

When the last section of Drum 10 has been read off, PR operates and steps DS to position 12. Relay FN operates over wiper DS1. Make contacts fn1 provide a Homing circuit for DS which drives to position 1. Contact fn2 locks FN dependent upon STK. Make contacts fn3 and fn4 prepare a Finish Alarm Circuit which operates lamp FN' and bell when switches TSA, DS are home. Break contact fn5 permits re-operation of ST via TSA1, TSJ1, DS1 wipers. When wiper DS1 reaches its home contact, an earth is extended via wiper TSJ1 to the TSJ magnet and TSJ homes. The remaining TS uniselectors home in sequence, TSA being the last to do so. With TSA home, the Finish Alarm is given, STK is restored, and relays FN and STA release.

The circuit of the master control circuit does not show facilities for reading off one selected line. The circuit can be modified to include this feature by arranging to position DS and the appropriate Track Selector, and also to fire the Distributor tube corresponding to the tens and units digits of the required number. The start signal is then applied to the Track Control Circuit. After the information has been recorded, the master control circuit is released.

The object of the binary-decimal converter, Figs. 30, 31 and 32, is to receive the number recorded on the drum, which is in binary notation, and transfer it into decimal notation in order that the number of calls recorded on any section can be transferred to recording equipment in decimal form. The converter consists essentially of a binary counter, Fig. 30, a group of flip-flops, Fig. 31, and a decimal counter, Fig. 32.

On the firing of tube ST in the guard circuit, Fig. 9, a potential is applied to STL causing tube TST, Fig. 31, to fire. TST fires TTA and applies a pulse to the triggers of the tubes X1 . . . (Fig. 30) causing them to strike, if for some reason they are not in the fired condition. Pulses are received over the PSL lead (Fig. 30) from the guard circuit (Fig. 29). Connected to the trigger circuits of each Y tube is a coincidence network. Each pair of tubes in the binary counter correspond to an element of the drum, i. e. tubes X1 and Y1 correspond to element E1, tubes X2 and Y2 correspond to element E2, etc. Fig. 30 shows the tubes corresponding to the first four elements. Assume that the first four elements received are 0101 in binary form. As the first element E1 passes the read head, a pulse will appear on lead PSL. Pulse E1 is on as the first element E1 passes the Read Head; therefore Y1 will fire. There will be no pulse on PSL during E2 and Y2 will not fire. Y3 will be fired during E3, but Y4 will not strike as the fourth element passes the head. With Y1 and Y3 fired, X1 and X3 will be extinguished, i. e. the number stored on the appropriate section of the drum will be set up on the Y tubes of the Counter.

When the last element of the section has been read off, a pulse is applied to the SP lead, Fig. 31, by the guard circuit (Fig. 29), and tube TSP fires, causing TST to be extinguished. With TTA and TSP fired, PST strikes and a start signal is applied to the pulse generator via lead PGT. Pulses of suitable frequency and amplitude are then applied to lead PUL, Fig. 30. Negative pulses are also applied to lead PUN, Fig. 32, to step the Decimal counter in synchronism with the binary counter.

It will be assumed that the digit applied to the counter was 5, i. e. 0101 binary notation. Therefore tubes Y1, X2, Y3, X4 and the remainder of the X tubes are fired. The first pulse fires X1 and Y1 is extinguished. The second pulse fires Y1, Y2 is fired via gate YG2 under control of X1, X2; X3 is fired via gate XG3 under control of X1, X2, Y3. X1, X2 and X3 are extinguished. Pulse 3 fires X1 only, and Y1 is extinguished. Pulse 4 fires Y1 and X2 fires via gate XG2 under control of X1 and Y2, thus extinguishing X1 and Y2. The fifth pulse fires X1 and Y1 is extinguished. The counter is now in the condition that all X tubes are fired, which is the "Finish Counting" condition. When TSP and all X tubes are fired, TFG fires and extinguishes TTA. TFG also strikes PSP which extinguishes PST. PSP gives a signal to the printer control circuit (Fig. 23) via the PR lead, indicating that the counting is complete. With PST extinguished, the start condition is removed from the pulse generator which stop sending pulses to the PU and PUN leads.

The decimal counter has also been stepped by the five pulses sent by the Pulse Generator. In the event of a section of track being read off, on which nothing is stored, i. e. a Spare number, none of the Y tubes are fired. In this case when TSP is fired, TFG and PST are also fired. TFG in turn fires PSP which extinguishes PST. With a delay in the Pulse Generator, the sending of pulses can be prevented although a start signal of short duration may be received by the pulse generator.

The decimal counter (Fig. 32) consists of a number of multicathode tubes connected in tandem. TU is the units tube TD the tens, TC the hundreds etc. Only two such tubes are shown on the drawing. To read 9999 calls, the capacity of existing message registers, four such multicathode tubes will be required. The home position of each tube is the 1st cathode K1. Associated with each of the tubes, TU, TD and TC is a gating tube GU, GD and GC respectively. When the start key STK of the master control circuit is thrown, a potential is applied by one contact shown in Fig. 32, to the trigger of GU. At the start of the count, TU, TD and TC are each fired on K1. This represents 000 (in decimal notation). As each pulse is received TU takes one step. After 9 pulses have been received, TU has stepped to K10, representing 9. On this position GD is primed and the 10th pulse will therefore step TU to K1 and will also be gated through GD to step TD to K2 representing 10. In a similar manner TD steps on every tenth pulse. After 99 pulses TU has K10 fired and TD has K10 fired. Tubes GD and GC are primed and when the 100th pulse is received, TU steps to K1, TD steps to K1 and TC to K2. Similarly TC steps on every 100th pulse. Therefore with the three tubes shown total of 999 can be registered.

The cathodes of the three tubes TU, TD and TC are connected through to the record control circuit. The ten cathodes of TU denote the units digits, those of TD the tens digits and those of TC the hundreds digits, according to the positioning of the tubes, so the number of calls can be read in decimal notation. This decimal information can be translated into teleprinter code, as previously described, and printed.

The number of pulses applied to the decimal counter is the number required to drive the binary counter to its "home" position, i. e. all X tubes fired.

When all the information relating to a particular subscriber has been printed, the printer control circuit applies a signal to the master control circuit on the FN lead, Fig. 27. Similarly a reset signal is applied to the reset lead of the binary-decimal converter to fire each tube over its K1 cathode, this being the start position for each count.

As described above, the decimal equivalent of the number stored on the drum is set up on tubes TU, TD, etc. The cathodes of these tubes are connected to the printer control circuit. The master control circuit identified the number of the subscriber connected to the section of track being read off.

Simple selection equipment will first determine the number of the subscriber from the master control circuit and print this number. When this has been printed and a signal received from the converter over the PR lead, Fig. 31 indicating that the conversion is complete, the number stored on tubes TU, TD, TC etc. is printed. When this has been printed, the printer control circuit will give a finish signal to the master control circuit and a reset signal to the converter. The equipment is now ready to deal with the next section of the track.

The mixer circuit, Fig. 17, contains a tube MV1, not so far mentioned. This tube enables the drum pulse circuit and the read and store amplifiers to be switched on only when the condition of the track is to be changed, i. e. on receipt of a metering signal.

MV1 is added to each mixing circuit, and is connected via blocking rectifiers to each metering lead. When a metering signal is applied, MV1 conducts and a potential is developed at its cathode. This potential applies a start signal to the read and re-store amplifiers of the track (Fig. 15) and also to the common drum pulse circuit. Therefore these circuits function when a metering signal is applied to any one or more of the hundred P wires. When there is no metering signal on the leads, MV1 cuts off. It is therefore necessary that the time taken for one revolution be less than the minimum time of the metering signal, i. e. the minimum rotational speed of the drum would be 600 R. P. M.

The Master Control Circuit can be arranged to cause tube MV1 of the appropriate Mixing Circuit to conduct when it is required to read off the information on the track corresponding to that Mixing Circuit.

It will be seen that with the magnetic drum, an item of intelligence read, and if desired modified, can be re-stored either in a second storage section allocated to said item or in the same portion from which it was extracted. In the mercury delay line (Fig. 13), an item extracted from the outgoing end of the line is re-inserted at the incoming end. In the cathode ray tube (Fig. 14), as clearly brought out in the above-mentioned article, the ray remains on a spot for a definite time period and thus is sufficient for a binary element to be read via the end-screen and passed back either the same or inverted to the input oscillator, so as to be applied via the ray to the same spot either to re-inforce the existing condition, or to "overprint" it with the opposite condition.

It will be seen that each number or other item of intelligence is read binary element by binary element, that if desired the number is modified, element by element, after which the number is re-stored, the whole series of operations taking place for one number or item before commencement of reading of the next.

The numbers stored on the drum tracks and the corresponding metering leads are continously and synchronously scanned and the number is modified if a corresponding metering condition exists. Intelligence from two different groups of sources, the drum track sections and the metering leads are continuously read, and an output obtained depending on the combined intelligence from each track section and its corresponding metering lead, or external control. The form of the output is also controlled by the EM condition carried by each stored number: if an EM pulse is present, it prevents modification of the number by a metering signal because the pulse records that the metering pulse has already been responded to.

Each drum track may constitute a set of telephone subscribers message registers, which can be read electrically and the reading statistically represented, that is, printed or otherwise recorded in column form, suitable for a permanent record.

A single track could of course be carried by a disc, which should be taken to include an annulus. A magnetic tape or wire, preferably endless, could also be used.

Although modification of a number by adding 1 has been described, any other modification of a number or any modification of any other item of intelligence is within the scope of the invention.

While the principles of the invention have been described above in connection with specific embodiments, and particular modifications thereof, it is to be clearly understood that this description is made only by way of example and not as a limitation on the scope of the invention.

What we claim is:

1. Equipment for the storage of items of intelligence expressed as binary numbers, comprising a magnetizable track having at least one section assigned to each of said items, each section being divided into a plurality of discrete elements one for each digit of an item, means for recording a digital value in each of the elements of each of said sections in turn, means for reading in turn and in the same order the values stored in said elements, a computing device, means for signaling to said computing device the first digital value read in one of said sections, means coupled to said computing device for indicating thereto that the item stored in said one section requires modification, means in said computing device responsive to said indication for computing a digital value concurrently with the receipt of the signal of the first digital value, means for concurrently signaling said computed value to said recording means whereby said computed value is recorded in a section assigned to said item, and means for thereafter alternately signaling to said computing device a further value read in said one section and concurrently recording in said section assigned to said item a corresponding computed value.

2. Equipment for the storage of items of intelligence as claimed in claim 1, and further comprising means in said computing device, effective in the absence of said indication, whereby the successive values computed therein, signaled to said recording means and recorded in said section assigned to said item are the same as the corresponding values read in said one section, whereby the item read in said one section is concurrently re-stored without modification.

3. Equipment for the storage of items of intelligence expressed as binary numbers, comprising a memory device having two storage sections assigned to each of said items, each section being divided into a plurality of discrete elements one for each digit of an item, means for recording a digital value in each of the elements of each of said sections in turn, means for reading in turn and in the same order the values stored in said elements, a computing device, means for signaling to said computing device the first digital value read in one of the sections assigned to one of said items, means coupled to said computing device for indicating thereto that said one item requires modification, means in said computing device responsive to said indication for computng a digital value concurrently with the reecipt of the signal read in said one section, means for concurrently signaling said computed value to said recording means whereby said computed value is concurrently recorded in the other section assigned to said one item, and means for thereafter alternately signaling to said computing device a further value read in said one section and concurrently recording in said other section a corresponding computed value, whereby the item read in said one section is modified and re-stored in said other section.

4. Equipment for the storage of items of intelligence as claimed in claim 3, and further comprising means in said computing device, effective in the absence of said indication, whereby the successive values computed therein, signaled to said concurrently recording means and recorded in said other section are the same as the corresponding values read in said one section, whereby the item read in said one section is concurrently re-stored without modification.

5. Equipment for the storage of items of intelligence, as claimed in claim 4, and in which said computing device includes means which, upon the receipt of said first digital value signaled thereto, concurrently computes and signals to said recording device the binary complement of said received value and thereafter, upon the receipt of each succeeding value, concurrently computes and signals to said recording device the binary complement of said succeeding value if the immediately preceding received value was 1 and signals to said recording device said succeeding value without modification if the immediately preceding received value was 0, whereby the item concurrently recorded in said other section is the item read in said one section increased by 1.

6. Equipment for the storage of items of intelligence, as claimed in claim 4, and further comprising means effective when the values stored in said other section are being read, for concurrently recording corresponding computed values in said one section.

7. Equipment for the storage of items of intelligence, as claimed in claim 6, and further comprising means for repeatedly reading the items stored in said one section and said other section alternately and for repeatedly and concurrently re-storing items derived therefrom in said sections alternately.

8. Equipment for the storage of items of intelligence, as claimed in claim 6, and further comprising a number recording device and means for signaling thereto the digital values read in a selected one of said sections, whereby the item stored in said section is recorded in said recording device.

9. Equipment for the storage of items of intelligence, as claimed in claim 8, and further comprising means for thereafter zeroizing the record of said item in said section.

10. Equipment for the storage of items of intelligence, as claimed in claim 8, and further comprising means for disabling said means for signaling to said number recording device when said indication that said item requires modification is present.

11. Equipment for the storage of items of intelligence, as claimed in claim 3, and further comprising means in said recording means whereby the recording of a computed value in any element of said other section overprints and obliterates the value previously stored in that element.

12. Equipment for the storage of items of intelligence, as claimed in claim 2, in which the magnetizable track is a closed circumferential track on the periphery of a rotatable drum, and further comprising a plurality of other parallel closed circumferential tracks on said rotatable drum, said drum having a reading head per track and a recording head per track, and means for coupling corresponding pairs of said reading and recording heads in turn to said computing device, the reading and recording heads of a pair being coupled concurrently to said computing device.

13. Equipment for the storage of items of intelligence, as claimed in claim 12, and further comprising a plurality of said rotatable drums and means for coupling the reading and recording heads of each of said drums in turn to said computing device the reading and recording heads of each pair being coupled concurrently to said computing device.

14. Equipment for the storage of items of intelligence as claimed in claim 2, and in which said memory device is a mercury delay line.

15. A converter for converting a number expressed in a first notation into a second notation which comprises a storage circuit in which a number to be converted is stored in said first notation, a pulse supply circuit to said storage circuit over which pulses are applied to said storage circuit when a number to be converted has been stored therein, means responsive to said pulses for causing each pulse received by said storage circuit to reduce the stored number by unity, a counter which counts in said second notation pulses which it receives, a pulse supply circuit to said counter over which said counter receives a pulse each time said storage circuit receives a pulse, each pulse received by said counter adding unity to the contents thereof, and means responsive to the number stored in said storage circuit reaching zero to stop the supply of pulses to said counter, whereby a number of pulses equal to the number to be converted has been applied to said counter.

16. A converter, as claimed in claim 15, in which said first notation is binary digital notation, and in which said storage circuit comprises a plurality of bistable circuits, means for inserting a number expressed in binary notation to be converted in said binary storage circuit, and interconnections between said bistable circuits whereby each pulse applied thereto reduces the binary number by unity.

17. A converter, as claimed in claim 16, and in which said second notation is decimal notation.

18. A binary-to-decimal converter which comprises a binary storage circuit formed by a series of bistable circuits, one per digit of a number to be converted, which may be set to store a number to be converted to decimal notation, a pulse supply circuit to said binary storage circuit over which pulses are applied to said binary storage circuit when a number to be converted has been stored therein, means responsive to said pulses for causing each pulse received by said storage circuit to reduce the stored number by unity, a decimal counter, a pulse supply circuit to said decimal counter over which said decimal counter receives a pulse each time said binary storage circuit receives a pulse, each pulse received by said decimal counter adding unity to the contents thereof, and means responsive to the number stored in said binary storage circuit reaching zero to stop the supply of pulses to said decimal counter, whereby a number of pulses equal to the number to be converted has been applied to said decimal counter.

19. A converter, as claimed in claim 16, and in which each said bistable circuit comprises a pair of cold cathode gas-filled discharge tubes of which only one can be in a stable discharging condition at once.

20. A converter, as claimed in claim 15, and in which said means for stopping the supply of pulses to said counter comprises a coincidence gate circuit having a controlling input associated with each denomination of said storage circuit, means for energising a controlling input when the stage of said storage circuit associated therewith is in its zero condition, said coincidence gate circuit being arranged to deliver an output when all of said inputs are simultaneously energized, and means responsive to an output from said gate circuit to stop the supply of pulses from the pulse supply circuit.

21. A converter, as claimed in claim 15, and in which said counter comprises a plurality of interconnected multi-gap cold cathode gas-filled discharge tubes, one per denomination.

22. Equipment for the storage of items of intelligence, as claimed in claim 3, and in which said memory device is a closed, magnetizable, circumferential track on the periphery of a rotatable drum, said drum also comprising a first toothed track having one tooth for each section of said magnetizable track, and a second toothed track having one tooth for each element of each said section.

References Cited in the file of this patent

UNITED STATES PATENTS

| | | |
|---|---|---|
| 2,540,654 | Cohen | Feb. 6, 1951 |
| 2,549,071 | Dusek | Apr. 17, 1951 |
| 2,564,403 | May | Aug. 14, 1951 |
| 2,609,143 | Stabitz | Sept. 2, 1952 |
| 2,609,439 | Marshall | Sept. 2, 1952 |
| 2,611,813 | Sharpless | Sept. 23, 1952 |
| 2,614,169 | Cohen | Oct. 14, 1952 |
| 2,700,148 | McGuigan, et al. | Jan. 18, 1955 |

FOREIGN PATENTS

| | | |
|---|---|---|
| 997,062 | France | Oct. 8, 1949 |

OTHER REFERENCES

Memory System, Eckert, May 1950. "Proceedings of the IRE," May 1950, pp. 498, 510.

Magnetic Store, Williams, April 1952, "Proceedings Inst. Electrical Engineers" pp. 96–106.

Magnetic Drum Storage, January 1950, "Automatic Computing Machinery," pp. 31—39.